United States Patent
Kita et al.

(10) Patent No.: US 11,799,559 B2
(45) Date of Patent: Oct. 24, 2023

(54) OPTICAL IQ MODULATOR

(71) Applicant: Nippon Telegraph and Telephone Corporation, Tokyo (JP)

(72) Inventors: Shota Kita, Tokyo (JP); Masaya Notomi, Tokyo (JP); Akihiko Shinya, Tokyo (JP); Kengo Nozaki, Tokyo (JP); Kenta Takata, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/794,738

(22) PCT Filed: Feb. 20, 2020

(86) PCT No.: PCT/JP2020/006843
§ 371 (c)(1),
(2) Date: Jul. 22, 2022

(87) PCT Pub. No.: WO2021/166173
PCT Pub. Date: Aug. 26, 2021

(65) Prior Publication Data
US 2023/0058153 A1   Feb. 23, 2023

(51) Int. Cl.
*H04B 10/00* (2013.01)
*H04B 10/556* (2013.01)

(52) U.S. Cl.
CPC .................. *H04B 10/556* (2013.01)

(58) Field of Classification Search
CPC ................ H04B 10/556; G02F 1/01
See application file for complete search history.

(56) References Cited

U.S. PATENT DOCUMENTS

| | | | |
|---|---|---|---|
| 5,039,988 A * | 8/1991 | Hong ................... | G02F 7/00 341/137 |
| 6,211,996 B1 * | 4/2001 | Fuse .................... | H03C 7/00 359/278 |
| 7,061,414 B2 * | 6/2006 | Chen ................... | G02F 7/00 250/214 R |
| 7,525,461 B1 * | 4/2009 | Uhlhorn ............. | G02F 7/00 341/137 |
| 8,693,891 B2 * | 4/2014 | Nishihara ........... | H04B 10/505 398/208 |
| 8,705,900 B2 * | 4/2014 | Goh .................... | H04B 10/5162 385/2 |
| 8,737,843 B2 * | 5/2014 | Schemmann ...... | H04B 10/6151 398/208 |
| 9,280,032 B2 * | 3/2016 | Fujisawa ............ | G02F 2/02 |
| 9,344,194 B2 * | 5/2016 | Kim ................... | H04B 10/5053 |

(Continued)

OTHER PUBLICATIONS

Lu et al., "Reconfigurable multilevel transmitter using monolithically integrated quad Mach-Zehnder IQ modulator for optical 16-QAM and 8-PSK generation", Optic Express, vol. 19, No. 6, Mar. 2011, pp. 5596-5601.

*Primary Examiner* — Agustin Bello
(74) *Attorney, Agent, or Firm* — Slater Matsil, LLP

(57) ABSTRACT

An optical IQ modulator includes: Y branching elements, which are cascade-connected, each of which has one input and two outputs; QPSK modulators configured to perform QPSK modulation on continuous light branched by the Y branching elements to generate signal light; and Y combining elements, which are cascade-connected, each of which has two inputs and one output.

6 Claims, 22 Drawing Sheets

(56) References Cited

U.S. PATENT DOCUMENTS

| | | | | |
|---|---|---|---|---|
| 9,835,928 B1* | 12/2017 | Shen | | G02F 1/2255 |
| 10,110,314 B2* | 10/2018 | Griffin | | H04J 14/06 |
| 10,164,713 B2* | 12/2018 | Tanaka | | G02F 1/025 |
| 10,367,586 B2* | 7/2019 | Yue | | H04B 10/541 |
| 11,296,794 B2* | 4/2022 | Hashemi Talkhooncheh | | G02F 1/225 |
| 2008/0018513 A1* | 1/2008 | Frazier | | G02F 7/00 |
| | | | | 341/144 |
| 2009/0244685 A1* | 10/2009 | Hoshida | | H04B 10/50575 |
| | | | | 359/279 |
| 2010/0014801 A1* | 1/2010 | Doi | | H04B 10/541 |
| | | | | 385/2 |
| 2010/0080571 A1* | 4/2010 | Akiyama | | H04B 10/5561 |
| | | | | 398/186 |
| 2010/0303469 A1* | 12/2010 | Barton | | H04B 10/6151 |
| | | | | 29/428 |
| 2011/0182590 A1* | 7/2011 | Secondini | | H04L 27/36 |
| | | | | 398/186 |
| 2012/0308240 A1* | 12/2012 | Akiyama | | H04B 10/5053 |
| | | | | 398/186 |
| 2013/0108277 A1* | 5/2013 | Liu | | H04L 27/2096 |
| | | | | 398/184 |
| 2013/0170841 A1* | 7/2013 | Liu | | H04B 10/541 |
| | | | | 398/183 |
| 2013/0195394 A1* | 8/2013 | Hosokawa | | H04B 10/5053 |
| | | | | 385/3 |
| 2013/0322809 A1* | 12/2013 | Goh | | H04B 10/5161 |
| | | | | 385/3 |
| 2014/0037286 A1* | 2/2014 | Krasulick | | H04B 10/07955 |
| | | | | 398/38 |
| 2014/0133870 A1* | 5/2014 | Lee | | H04B 10/541 |
| | | | | 398/186 |
| 2014/0153075 A1* | 6/2014 | Malacarne | | H04B 10/5053 |
| | | | | 359/238 |
| 2015/0198859 A1* | 7/2015 | Chen | | H04B 10/5053 |
| | | | | 385/3 |
| 2015/0229405 A1* | 8/2015 | Yu | | H04B 10/532 |
| | | | | 398/208 |
| 2015/0293426 A1* | 10/2015 | Balsamo | | G02F 1/21 |
| | | | | 359/279 |
| 2016/0139485 A1* | 5/2016 | Winzer | | G02F 1/2255 |
| | | | | 385/3 |
| 2016/0269123 A1* | 9/2016 | Akiyama | | H04B 10/5561 |
| 2018/0062753 A1* | 3/2018 | Yue | | H04B 10/541 |
| 2019/0229811 A1* | 7/2019 | Gupta | | H04B 10/614 |
| 2019/0305854 A1* | 10/2019 | Campos | | H04B 10/6164 |
| 2019/0312647 A1* | 10/2019 | Yue | | H04B 10/564 |
| 2020/0274621 A1* | 8/2020 | Yamanaka | | H04B 10/5053 |
| 2020/0275173 A1* | 8/2020 | Mir Shafiei | | H04Q 11/0005 |
| 2020/0408989 A1* | 12/2020 | Kita | | G02F 7/00 |
| 2021/0175974 A1* | 6/2021 | Eftekhar | | H04B 10/532 |
| 2021/0263387 A1* | 8/2021 | Mizrahi | | G02F 1/225 |
| 2021/0278746 A1* | 9/2021 | Kita | | G02B 6/12 |
| 2022/0299800 A1* | 9/2022 | Takechi | | H04B 10/50575 |
| 2023/0058153 A1* | 2/2023 | Kita | | G02F 1/01 |

* cited by examiner

OPTICAL IQ MODULATOR

CROSS-REFERENCE TO RELATED APPLICATIONS

This application is a national phase entry of PCT Application No. PCT/JP2020/006843, filed on Feb. 20, 2020, which application is hereby incorporated herein by reference.

TECHNICAL FIELD

The present invention relates to an optical IQ modulator capable of generating a high gradation signal.

BACKGROUND

Optical coherent communication technologies using an IQ modulation scheme in which signal amplitudes and phases are subjected to binary modulation or multi-value modulation have increasingly been put into practical use in recent years and have supported an increase in capacity of core communication. There are various formats of IQ modulation schemes. Thus, many dedicated or general-purpose optical transceivers that are compatible with each format, known as optical IQ modulators, have been proposed, developed, and used. Many of these optical IQ modulators have a configuration in which a plurality of Mach-Zehnder interferometers (MZIs) are connected in parallel or in series.

The emergence and development of Si photonics have activated a trend to integrate a large number of optical switches on chips. For example, optical circuits have been developed in which matrix optical switches with a size of equal to or greater than 32×32 and the like are integrated with high precision. Also, many of trends of using light not only for optical communication applications but also for arithmetic operations have been observed simultaneously in the world in response to such a trend of increase in scale of integration.

Advantages of utilization of light for arithmetic operations are as follows.

(a) A signal propagation speed is a light speed and thus a system having a small operation delay (latency) can be achieved.

(b) It is possible to highly efficiently perform a vector operation and Fourier transform, which require high costs in electric circuits, only through transmission of optical signals within a linear optical circuit.

For electric circuits, degrees of integration have been enhanced by thoroughly pursuing fine design, and throughputs per chip area have been improved. However, because wiring resistances and capacities increase as side effects of the fine design of the electric circuits, latency has kept increasing due to a significant increase in CR delay.

On the other hand, optical circuits can reduce latency because there is no CR delay and sizes of optical switches have been reduced with advancement of photonics technologies in recent years. Thus, optical operations are considered to be important for applications specialized in low latency properties.

In recent years, it has become known that about 90% of power consumption is occupied by vector operations in neural network accelerators that have attracted attention around the world with trends of artificial intelligence (AI). In order to highly efficiently perform the vector operations using light, optical neural network (ONN) accelerators have been proposed in which analog optical switches are cascade-connected.

For the ONN accelerators, studies for demonstrating principles have been carried out in the field of early sound recognition and the like. Further, because the ONN is one kind of complex-valued neural network (NN), it is possible to cause two pieces of analog information to be included in one input by using an amplitude and a phase or two components of an I axis and a Q axis.

An input of the ONN requires optical IQ modulators, the number of which corresponds to the number of input channels. As to optical analog signals generated by the optical IQ modulators, a given amplitude and a given phase or a given I component and a given Q component can be ideally specified, but gradations of the analog signals output by the practical optical IQ modulators are finite. In order to secure operation accuracy, gradations of optical analog signals to be input to the ONN are needed to be high to some extent. For example, even the Mixed National Institute of Standards and Technology (MNIST) database, which is a significantly basic letter recognition image set, includes gray-scale images of 2 gradations.

Although it is necessary to separately inspect how much gradations of optical analog signals affect operation accuracy in each application field, it is meaningful to achieve optical IQ modulators that enable high-gradation inputs to the ONN in order to prevent the input side from having a disadvantage that leads to degradation of operation accuracy.

Optical IQ modulators for communication applications have an old history, and various configurations have been proposed. Representative modulation schemes include amplitude phase shift keying (APSK) and quadrature amplitude modulation (QAM). In a case in which high-order inputs to the ONN are needed, APSK is not appropriate as an input format for the ONN because phase setting becomes rougher for larger amplitude values, which leads to poor balance. QAM allows for finer phase setting for larger amplitude values and is excellent in terms of uniformity and maintenance of a signal-to-noise ratio (SNR). In embodiments of the present invention, it is assumed that QAM is achieved using an optical IQ modulator.

For communication applications, 16 QAM, 32 QAM, and 64 QAM are used for high-order multi-value modulation. A required SNR level significantly increases for high-order QAM of 64 QAM or more, and thus, in a current situation, such high-order QAM has hardly been considered for communication applications that assume a situation in which light attenuation and environmental noise are large. However, in arithmetic operation or communication for a short distance such as between chips or on a chip, it is possible to substantially ignore reduction of the SNR, and there is thus a high likelihood that utilization of higher gradation communication formats will be further studied and an importance thereof will increase.

Various configurations for optical IQ modulators that achieve high-order QAM have been proposed (see NPL 1). In order for a single configuration to deal with a plurality of communication formats, many configurations have a tendency to place priority on reconfigurability in a current situation. Implementation of multi-value modulation that exceeds the current level on the optical circuit side is not assumed from the beginning, and an increase in gradation is assumed to be achieved by multi-valuing using a digital signal processor (DSP) and a digital-to-analog converter (DAC) on an electrical side.

If multi-value modulation is implemented with a configuration of optical IQ modulators known in the current situation, for example, a configuration in which optical IQ modulators are cascade-connected, an increase in gradation may be accompanied not only by an increase in light attenuation, that is, an insertion loss, but also by accumulation of electrical noise on the input side. In other words, it is not possible to expect a drastic improvement in communication capacity per unit power on a short-distance scale as long as the current configuration is used. If DSP and DAC are assumed be frequently used for an ONN application, this results in an inefficient configuration, and there is a concern that such a configuration cannot be distinguished from NN using a complementary metal oxide semiconductor (CMOS).

CITATION LIST

Non Patent Literature

NPL 1: Guo-Wei Lu, Takahide Sakamoto, Akito Chiba, Tetsuya Kawanishi, Tetsuya Miyazaki, Kaoru Higuma, Masaaki Sudo, and Junichiro Ichikawa, "Reconfigurable multilevel transmitter using monolithically integrated quad Mach-Zehnder IQ modulator for optical 16-QAM and 8-PSK generation," OPTICS EXPRESS, Vol. 19, No. 6, 5596-01, 2011.

SUMMARY

Summary of Embodiments of the Invention

Technical Problem

Embodiments of the present invention have been made in order to solve the aforementioned problems, and an object thereof is to provide an optical IQ modulator capable of achieving a high-order QAM modulator with a low loss and high noise resistance.

Means for Solving the Problem

An optical IQ modulator according to embodiments of the present invention includes: N first Y branching elements, N being an integer equal to or greater than two, each of the N first Y branching elements having one input and two outputs and being configured to equally split input light into two beams of light; N first modulators, each of the N first modulators being configured to perform QPSK modulation on a corresponding one of N continuous beams of light branched by the N first Y branching elements to generate signal light; and N first Y combining elements, each of the N first Y combining elements having two inputs and one output and uses the signal light generated by a corresponding one of the N first modulators as an input, wherein the N first Y branching elements are cascade-connected such that each of the N first Y branching elements except for a most upstream one of the N first Y branching elements using a single continuous beam of light as an input uses light output from a first optical output port of two optical output ports of an upstream one of the N first Y branching elements as an input, output light obtained from a second optical output port of the two optical output ports of each of the N first Y branching elements is used as input light to a corresponding one of the N first modulators, each of the N first modulators performs QPSK modulation on the input continuous light in accordance with a bit for generating an I component and a bit for generating a Q component in an N×2-bit electrical digital signal, the N first Y combining elements are cascade-connected such that each of the (N−1) first Y combining elements except for a most upstream one of the N first Y combining elements uses light output from an optical output port of an upstream one of the N first Y combining elements as input light to a first optical input port, and each of the N first Y combining elements including the most upstream first Y combining element uses the signal light generated by a corresponding one of the N first modulators as input light to a second optical input port, and output light obtained from a most downstream one of the N first Y combining elements is output as QAM signal light.

Also, an optical IQ modulator according to embodiments of the present invention includes: a first Y branching element having one input and two outputs and configured to equally split input light into two beams of light; a first digital-to-analog converter configured to use one of the continuous beams of light branched by the first Y branching element as an input and output light as a result of an N-bit digital-to-analog operation, N being an integer equal to or greater than two; a second digital-to-analog converter configured to use the other one of the continuous beams of light branched by the first Y branching element as an input and output light as a result of an N-bit digital-to-analog operation; a phase shifter configured to shift a phase of the output light of the second digital-to-analog converter by $\pi/2$; and a first Y combining element having two inputs and one output and configured to combine the output light of the first digital-to-analog converter and output light of the phase shifter and output combined light, wherein the first digital-to-analog converter performs an N-bit digital-to-analog operation in accordance with an N-bit electrical digital signal for generating an I component, the second digital-to-analog converter performs an N-bit digital-to-analog operation in accordance with an N-bit electrical digital signal for generating a Q component, and output light obtained from the first Y combining element is output as QAM signal light.

Effects of Embodiments of the Invention

According to embodiments of the present invention, it is possible to achieve a high-order QAM modulator with a low loss and high noise resistance as compared with that in the related art by cascade-connecting the N first Y branching elements, each of which has one input and two outputs, cascade-connecting the N first Y combining elements, each of which has two inputs and one outputs, and providing the N first modulators that perform QPSK modulation on the continuous light branched by the N first Y branching elements to generate the signal light to the second optical input ports of the first Y combining elements.

Also, according to embodiments of the present invention, it is possible to achieve a high-order QAM modulator with a low loss and high noise resistance as compared with that in the related art by providing the first Y branching element having one input and two outputs, the first digital-to-analog converter using one of the continuous beams of light branched by the first Y branching element as an input, the second digital-to-analog converter using the other one of the continuous beams of light branched by the first Y branching element, the phase shifter configured to shift the phase of the output light of the second digital-to-analog converter by $\pi/2$, and the first Y combining element having two inputs and one outputs and configured to combine the output light of the first digital-to-analog converter and the output light of the phase shifter.

Embodiments of the present invention reduce an insertion loss in response to an increase in gradation, that is, an increase in the number of input bits. Moreover, according to embodiments of the present invention, it is possible to curb accumulation of noise and to improve an SNR because electro-optical modulators are not cascade-connected. Although multi-value modulation of an optical IQ modulator typically requires DSP and DAC in many cases, a DAC part is absorbed on the optical circuit side in embodiments of the present invention. In other words, an optical QAM signal is generated directly from an electrical digital signal, and it is thus possible to eliminate the DSP and the DAC. According to embodiments of the present invention, it is thus possible to expect reduction of power consumption and a circuit area.

DETAILED DESCRIPTION OF ILLUSTRATIVE EMBODIMENTS

First Embodiment

Figure 1:
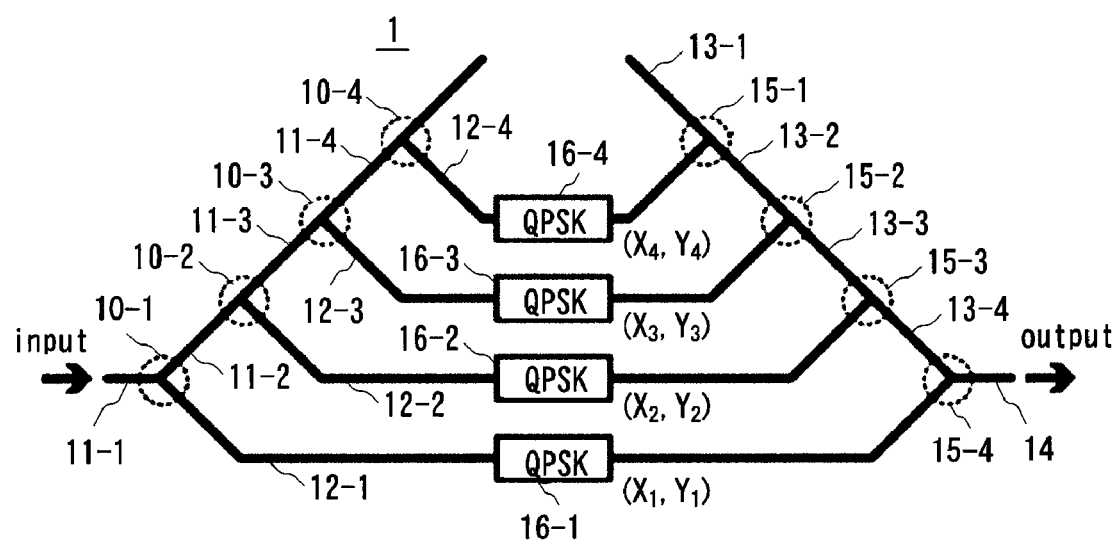
FIG. 1 is a block diagram illustrating a configuration of an optical IQ modulator according to a first embodiment of the present invention.
Figure 2:
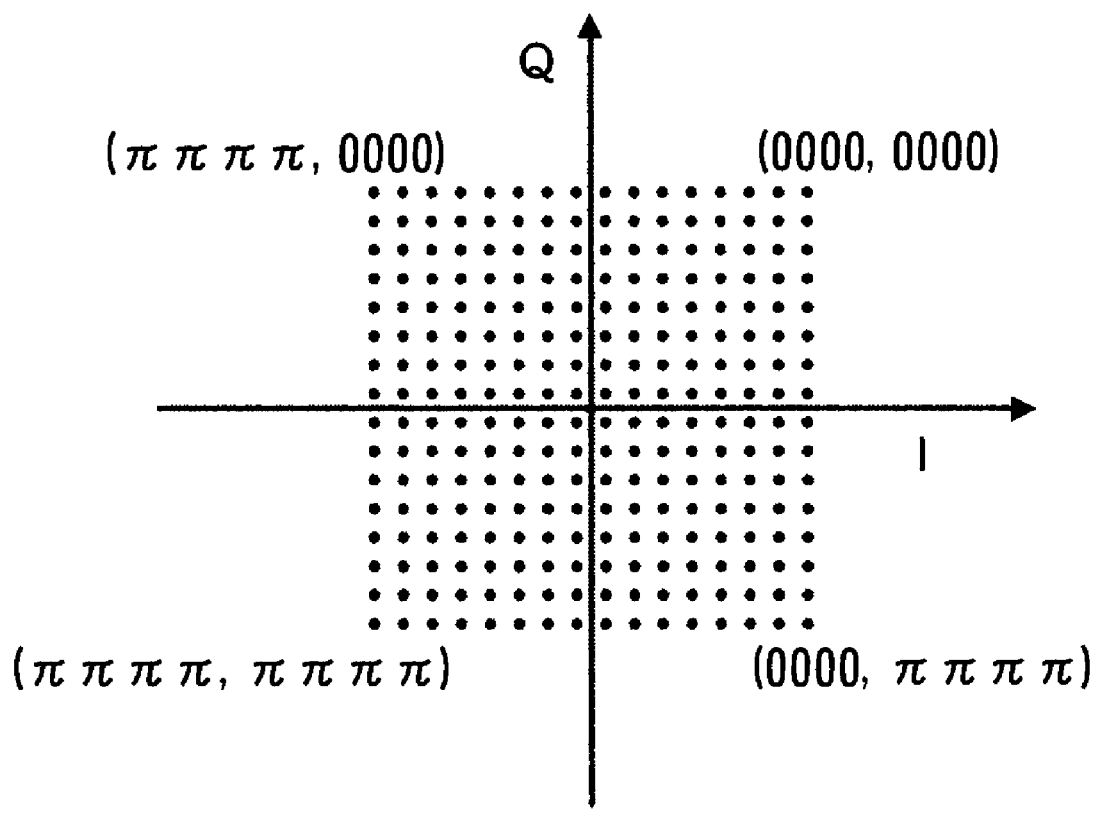
FIG. 2 is a diagram illustrating a constellation of an optical output signal of the optical IQ modulator according to the first embodiment of the present invention on an IQ plane.

Hereinafter, embodiments of the present invention will be described with reference to the drawings. FIG. 1 is a block diagram illustrating a configuration of an optical IQ modulator according to a first embodiment of the present invention, and FIG. 2 is a diagram illustrating a constellation of an optical output signal of the optical I/Q modulator on an IQ plane. An optical IQ modulator 1 in the present embodiment functions as a 2 QAM modulator that generates a 2 QAM signal. The optical IQ modulator 1 is obtained by replacing a phase modulator (PM) in an optical DAC disclosed in JP 2019-152848 A with a QPSK modulator.

Specifically, the optical IQ modulator 1 includes: N Y branching elements 10-1 to 10-N (N is an integer equal to or greater than two and is four in the present embodiment), each of which has one input and two outputs and which are cascade-connected; an optical waveguide 11-1 connected to an optical input port of the Y branching element 10-1 in the first stage; an optical waveguide 11-M (M is an integer equal to or greater than two and equal to or less than N) connecting one of optical output ports of a Y branching element 10-(M−1) in an (M−1)-th stage to an optical input port of a Y branching element 10-M in an M-th stage and inputting light output from the Y branching element 10-(M−1) to the Y branching element 10-M; optical waveguides 12-1 to 12-N connected to the other optical output ports of the Y branching elements 10-1 to 10-N; N Y combining elements 15-1 to 15-N, each of which has two inputs and one output and which are cascade-connected such that one of optical input ports is connected to a corresponding one of the optical waveguides 12-N to 12-1 and the other one of the optical input ports is connected to an optical output port of a Y combining element in a previous stage; an optical waveguide 13-1 connected to the other one of the optical input ports of the Y combining element 15-1 in the first stage; an optical waveguide 13-M connecting an optical output port of a Y combining element 15-(M−1) in the (M−1)-th stage to the other one of the optical input ports of a Y combining element 15-M in the M-th stage and inputting light output from the Y combining element 15-(M−1) to the Y combining element 15-M; an optical waveguide 14 connected to an optical output port of the Y combining element 15-N in the final stage; and quadrature phase shift keying (QPSK) modulators 16-1 to 16-N provided at the optical waveguides 12-1 to 12-N and modulating input continuous light in accordance with bits X for generating an I component and bits Y for generating a Q component in an N×2-bit electrical digital signal.

As the Y branching elements 10-1 to 10-N, the optical waveguides 11-1 to 11-N, 12-1 to 12-N, 13-1 to 13-N, and 14, and the Y combining elements 15-1 to 15-N, dielectric optical wiring such as a planar lightwave circuit (PLC) or semiconductor wiring such as a Si thin wire, for example, can be used.

Each Y branching element 10-$i$ (i is an integer equal to 1 to N) equally splits propagation light of the optical waveguide 11-$i$ into two beams of light (branching ratio of 1:1). In this manner, each Y branching element 10-$i$ is cascade-connected such that each Y branching element except for the most upstream Y branching element 10-1 using a single continuous beam of light as an input uses light output from one of the two optical output ports of the upstream Y branching element as an input.

In this manner, the continuous light input to the most upstream Y branching element 10-1 from a single continuous laser light source (not illustrated) is split into N continuous beams of light. Also, light intensity differences can be applied to the N continuous beams of light such that each of (N−1) continuous beams of light propagated through a corresponding optical waveguide 12-$k$ (k is an integer from 1 to N−1) has a light intensity that is double (3 dB) the optical intensity of continuous light propagated through the adjacent optical waveguide 12-($k$+1) on a lower bit side.

The QPSK modulator 16-$i$ (i=1 to N) performs modulation such that a phase of continuous light propagated through the optical waveguide 12-$i$ has four values in accordance with corresponding two-bit inputs $X_i$ and $Y_i$ of the electrical digital signal.

Figure 3:
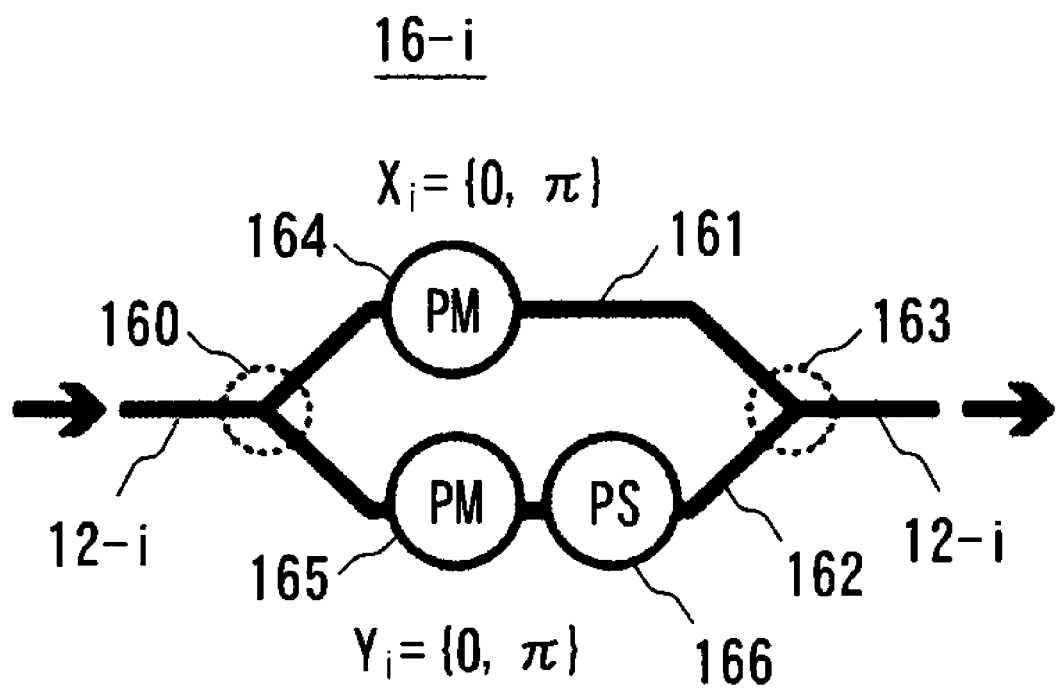
FIG. 3 is a block diagram illustrating a configuration of a QPSK modulator according to the first embodiment of the present invention.
Figure 4:
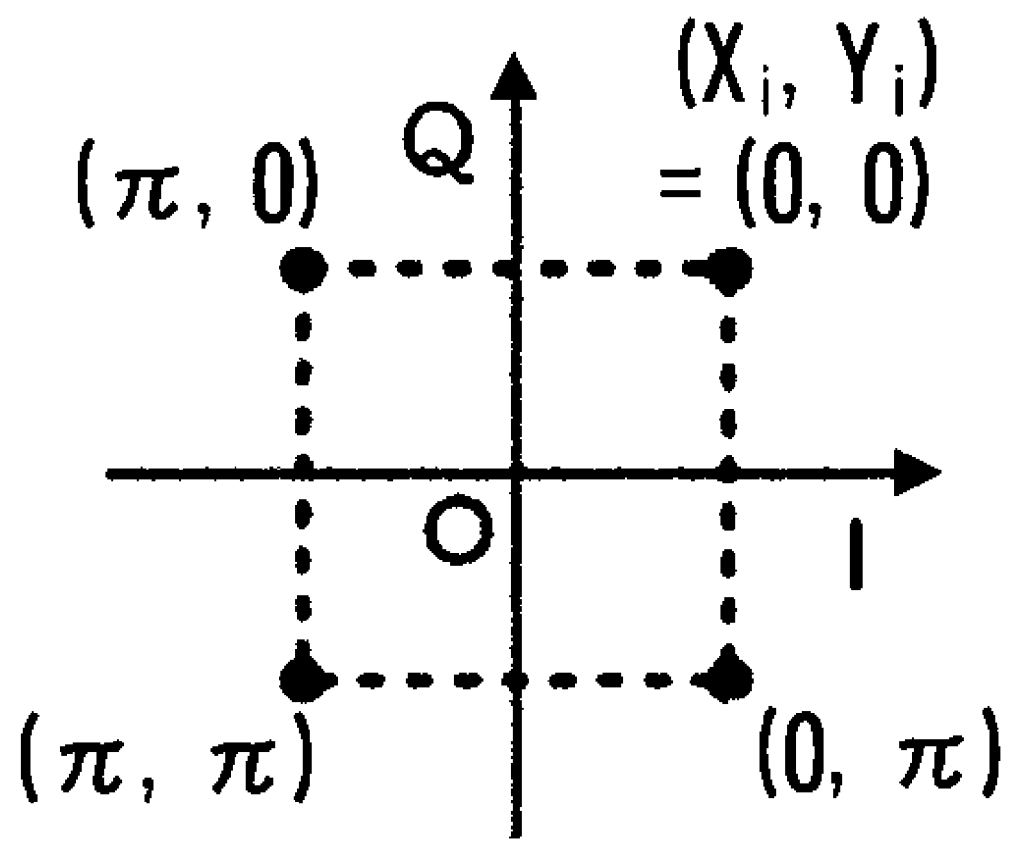
FIG. 4 is a diagram illustrating a constellation of an optical output signal of the QPSK modulator according to the first embodiment of the present invention on an IQ plane.

FIG. 3 is a block diagram illustrating a configuration of the QPSK modulator 16-$i$, and FIG. 4 is a diagram illustrating a constellation of an optical output signal of the QPSK modulator 16-$i$ on an IQ plane. The QPSK modulator 16-$i$ includes a Y branching element 160 having one input and two outputs in which an optical input port is connected to the optical waveguide 12-$i$, an optical waveguide 161 connected to one of the optical output ports of the Y branching element 160, an optical waveguide 162 connected to the other one of the optical output ports of the Y branching element 160, a Y combining element 163 having two inputs and one output in which one optical input port is connected to the optical waveguide 161 and the other optical input port is connected to the optical waveguide 162, a phase modulator 164 provided at the optical waveguide 161, a phase modulator 165 provided at the optical waveguide 162, and a phase shifter 166 provided at the optical waveguide 162.

The Y branching element 160 equally splits light propagated through the optical waveguide 12-I into two beams of light. The phase modulator 164 outputs continuous light propagated through the optical waveguide 161 without changing its phase in a case in which the corresponding bit $X_i$ of the electrical digital signal is "0" (same phase) and outputs the continuous light propagated through the optical waveguide 161 with the phase shifted by a in a case in which the bit $X_i$ is "1" (opposite phase). In this manner, a phase, namely the same phase (0) or the opposite phase ($\pi$), is individually allocated to the continuous light propagated through the optical waveguide 161 in accordance with the bit $X_i$, of the electrical digital signal.

Similarly, the phase modulator 165 outputs continuous light propagated through the optical waveguide 162 without changing its phase in a case in which the corresponding bit $Y_i$ of the electrical digital signal is "0" and outputs the continuous light propagated through the optical waveguide 162 with the phase shifted by a in a case in which the bit $Y_i$ is "1."

The phase shifter 166 outputs the light modulated by the phase modulator 165 with the phase shifted by $\pi/2$.

The Y combining element 163 combines the light propagated through the optical waveguide 161 and the light propagated through the optical waveguide 162 at an equal ratio and outputs the combined light.

The QPSK modulator 16-$i$ thus generates signal light to one of the optical input ports of the Y combining element 154.

The optical waveguide 13-1 deals with a zero input. In other words, no light is input to the optical waveguide 13-1.

The Y combining element 154 combines the light propagated through the optical waveguide 13-$i$ and the light propagated through the optical waveguide 12-$j$ (j=N−i+1) at an equal ratio (combining ratio of 1:1) and outputs the combined light. In this manner, each Y combining element 15-$i$ is cascade-connected such that each Y combining element uses signal light modulated by the QPSK modulator 16-$j$ as one optical input and each Y combining element except for the most upstream Y combining element 15-1 uses the light output from the optical output port of the upstream Y combining element as the other optical input.

If an I component and a Q component of the output of the Y combining element 15-N are coherent-detected and then plotted on an IQ plane, the 2 QAM signal illustrated in FIG. 2 is obtained.

For the QPSK modulator 16-$i$ (i=1 to N), a relative phase difference of the output light of the optical waveguides 161 and 162 constituting two arms needs to be zero. In order to perform adjustment to obtain such a phase relationship, inputs of the following four patterns are used.

All $X_i$ and $Y_i$ are "1". (I)

All $X_i$ and $Y_i$ are "0". (II)

All $X_i$ are "1" while all $Y_i$ are "0". (III)

All $X_i$ are "0" while all $Y_i$ are "1". (IV)

The inputs of the four patterns (I) to (IV) correspond to outputs at the four corners of the IQ plane in FIG. 2. Thus, it is only necessary to adjust the relative phases of the phase modulators 164 and 165 and the phase shifters 166 among all the QPSK modulators 16-$i$ in advance such that all absolute amplitude values of the I component and the Q component of the output light of the optical IQ modulator 1 are equal and maximized for the inputs of these four patterns. If the adjustment is completed, then the inputs "1" and "0" to the phase modulators 164 and 165 have relative phases adjusted to 0 (same phase) and $\pi$ (opposite phase).

In this manner, the present embodiment can achieve a high-order QAM modulator with a lower loss than in the related art.

Note that, although N is equal to 4 in the present embodiment, the present invention is not limited thereto. In the present embodiment, it is possible to achieve a high-order QAM of equal to or greater than 2 QAM by setting N to a higher value.

Second Embodiment

Figure 5:
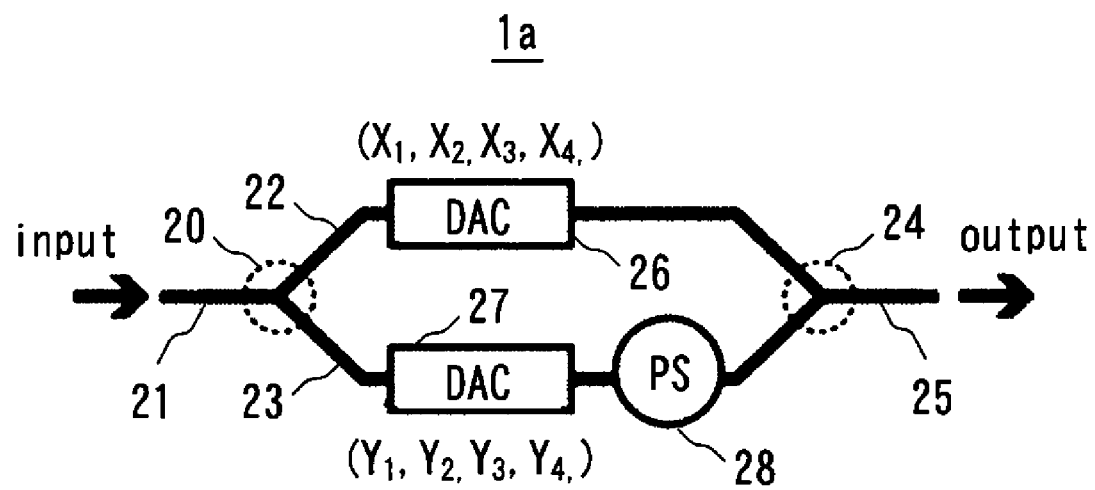
FIG. 5 is a block diagram illustrating a configuration of an optical IQ modulator according to a second embodiment of the present invention.
Figure 6:
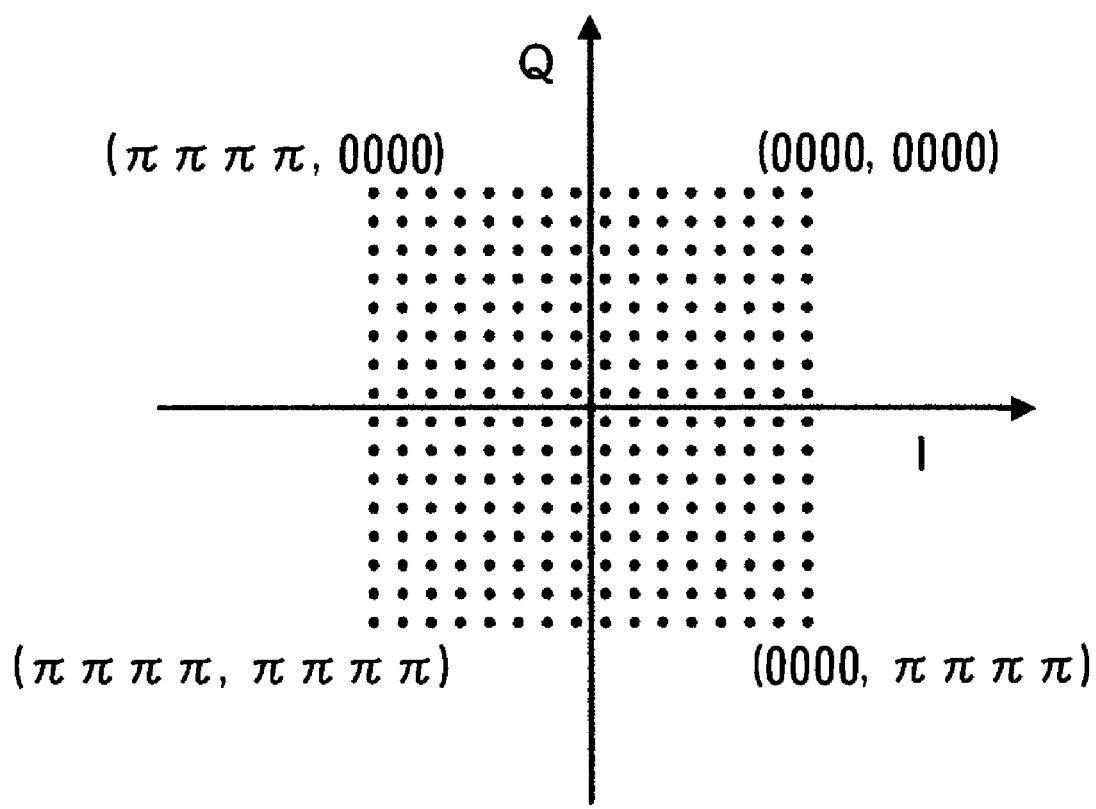
FIG. 6 is a diagram illustrating a constellation of an optical output signal of the optical I/Q modulator according to the second embodiment of the present invention on an IQ plane.

Next, a second embodiment of the present invention will be described. FIG. 5 is a block diagram illustrating a configuration of an optical IQ modulator according to the second embodiment of the present invention, and FIG. 6 is a diagram illustrating a constellation of an optical output signal of the optical I/Q modulator on an IQ plane. An optical IQ modulator 1a in the present embodiment functions as a 2 QAM modulator that generates a 2 QAM signal. The optical IQ modulator 1a is obtained by replacing the phase modulators 164 and 165 in the QPSK modulator illustrated in FIG. 3 with optical DACs disclosed in JP 2019-152848 A.

Specifically, the optical IQ modulator 1a includes a Y branching element 20 having one input and two outputs, an optical waveguide 21 connected to an optical input port of the Y branching element 20, an optical waveguide 22 connected to one of optical output ports of the Y branching element 20, an optical waveguide 23 connected to the other one of the optical output ports of the Y branching element 20, a Y combining element 24 having two inputs and one output in which one optical input port is connected to the optical waveguide 22 and the other optical input port is connected to the optical waveguide 23, an optical waveguide 25 connected to an optical output port of the Y combining element 24, and an N-bit optical DAC 26 provided at the optical waveguide 22 and outputting light as a result of an N-bit (N is an integer equal to or greater than two and is four in the present embodiment) digital-to-analog operation, an N-bit optical DAC 27 provided at the optical waveguide 23 and outputting light as a result of an N-bit digital-to-analog operation, and a phase shifter 28 provided at the optical waveguide 23. The N-bit optical DAC 26 deals with generation of a signal of an I component while the N-bit optical DAC 27 deals with generation of a signal of a Q component.

The Y branching element 20 equally splits continuous light input from a single continuous laser light source (not illustrated) into two beams of light.

The N-bit optical DAC 26 outputs optical signals with intensity in accordance with N-bit electrical digital signals $X_1$, $X_2$, $X_3$, and $X_4$ for generating an I component.

The N-bit optical DAC 27 outputs optical signals with intensity in accordance with N-bit electrical digital signals $Y_1$, $Y_2$, $Y_3$, and $Y_4$ for generating a Q component.

Figure 7:
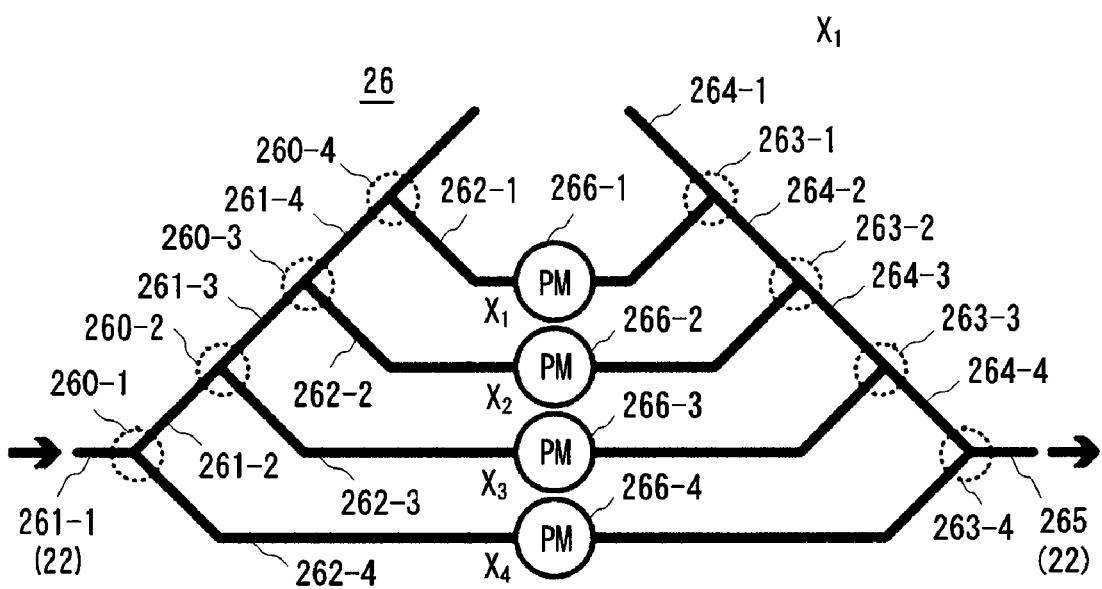
FIG. 7 is a block diagram illustrating a configuration of an N-bit optical DAC according to the second embodiment of the present invention.
Figure 8:
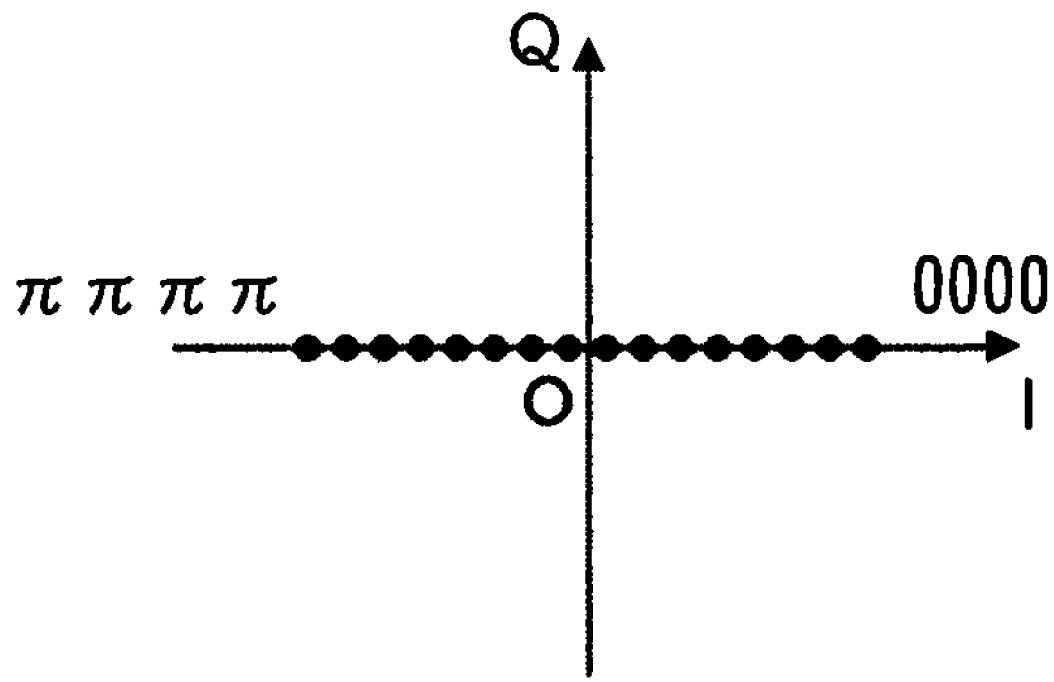
FIG. 8 is a diagram illustrating a constellation of an optical output signal of the N-bit optical DAC according to the second embodiment of the present invention on an IQ plane.

FIG. 7 is a block diagram illustrating a configuration of the N-bit optical DAC 26, and FIG. 8 is a diagram illustrating a constellation of an optical output signal of the N-bit optical DAC 26 on an IQ plane. The N-bit optical DAC 26 includes: N Y branching elements 260-1 to 260-N, each of which has one input and two outputs and which are cascade-connected; an optical waveguide 261-1 connected to an optical input port of the Y branching element 260-1 in the first stage; an optical waveguide 261-M (M=2 to N) connecting one of optical output ports of the Y branching element 260-(M−1) in the (M−1)-th stage to an optical input port of the Y branching element 260-M in the M-th stage and inputting light output from the Y branching element 260-(M−1) to the Y branching element 260-M; optical waveguides 262-N to 262-1 connected to the other optical output ports of the Y branching elements 260-1 to 260-N; N Y combining elements 263-1 to 263-N, each of which has two inputs and one output and which are cascade-connected such that one of optical input ports is connected to a corresponding one of the optical waveguides 262-1 to 262-N and the other optical input port is connected to the optical output port of the Y combining element in the previous stage; an optical waveguide 264-1 connected to the other optical input port of the Y combining element 263-1 in the first stage; an optical waveguide 264-M connecting the optical output port of the Y combining element 263-(M−1) in the (M−1)-th stage to the other optical input port of the Y combining element 263-M in the M-th stage and inputting light output from the Y combining element 263-(M−1) to the Y combining element 263-M; an optical waveguide 265 connected to the optical output port of the Y combining element 263-N in the final stage; and N phase modulators 266-1 to 266-N provided at the optical waveguides 262-1 to 262-N.

Each Y branching element 260-i (i=1 to N) equally splits the light propagated through the optical waveguide 261-i into two beams of light. In this manner, each Y branching element 260-i is cascade-connected such that each Y branching element except for the most upstream Y branching element 260-1 using a single continuous beam of light as an input uses, as an input, light output from one of two optical output ports of the upstream Y branching element.

In this manner, it is possible to branch the continuous light from the optical waveguide 22 into N continuous beams of light corresponding to the bits $X_1$, $X_2$, $X_3$, and $X_4$ of the N-bit electrical digital signals and to apply light intensity differences to the N continuous beams of light such that each of (N−1) continuous beams of light corresponding to a bit except for the least significant bit (LSB) $X_1$ of the N-bit electrical digital signal has light intensity that is double (3 dB) the light intensity of the continuous light corresponding to its lower adjacent bit.

The light corresponding to the i-th bit counted from the most significant bit (MSB) $X_4$ of the N-bit electrical digital signal is output from an optical output port, to which the Y branching element in the later stage is not connected, out of the two optical output ports of the i-th Y branching element 260-i from the most upstream side. An optical input to the optical waveguide 262-i corresponds to an input of an i-th bit counted from the LSB.

The phase modulators 266-1 to 266-N provided for respective bits of the N-bit electrical digital signal output the continuous beams of light propagated through the optical waveguides 262-1 to 262-N without changing the phases thereof in a case in which the corresponding bits $X_1$, $X_2$, $X_3$, and $X_4$ of the electrical digital signal are "0." Also, the phase modulators 266-1 to 266-N output the continuous beams of light propagated through the optical waveguides 262-1 to 262-N with the phases of the continuous light shifted by a in a case in which the bits $X_1$, $X_2$, $X_3$, and $X_4$ are "1."

The optical waveguide 264-1 deals with a zero input. In other words, no light is input to the optical waveguide 264-1.

The Y combining element 263-i combines the light propagated through the optical waveguide 264-i and the light propagated through the optical waveguide 262-i at an equal ratio and outputs the combined light. In this manner, each Y combining element 263-i is cascade-connected such that each Y combining element uses signal light modulated by the phase modulator 266-i as one of optical inputs and each Y combining element except for the most upstream Y combining element 263-1 uses the light output from the optical output port of the upstream Y combining element as the other optical input.

In this manner, it is possible to combine the N signal light beams modulated by the phase modulators 266-1 to 266-N into one light beam and to apply light intensity differences to the N signal light beams such that (N−1) signal light beams corresponding to respective bits except for the lowermost bit $X_1$ of the N-bit electrical digital signal has a light intensity that is double (3 dB) the light intensity of the continuous light corresponding to its lower adjacent bit.

The configuration of the N-bit optical DAC 26 described hitherto is disclosed in JP 2019-152848 A.

A configuration and operations of the N-bit optical DAC 27 are the same as those of the N-bit optical DAC 26 other than that N-bit electrical digital signals $Y_1$, $Y_2$, $Y_3$, and $Y_4$ are input instead of the N-bit electrical digital signals $X_1$, $X_2$, $X_3$, and $X_4$.

The phase shifter 28 of the optical IQ modulator 1a outputs the light modulated by the N-bit optical DAC 27 with the phase shifted by $\pi/2$.

The Y combining element 24 of the optical IQ modulator 1a combines the light propagated through the optical waveguide 22 and the light propagated through the optical waveguide 23 at an equal ratio and outputs the combined light.

If the I component and the Q component of the output of the Y combining element 24 are coherent-detected and are plotted on an IQ plane, then the 2 QAM signal as illustrated in FIG. 6 is obtained.

The adjustment method is the same as that in the first embodiment. Specifically, it is only necessary to adjust relative phases of the phase modulators 266-1 to 266-N and the phase shifters 28 of the N-bit optical DACs 26 and 27 in advance such that all of absolute amplitude values of the I component and the Q component of the output light of the optical IQ modulator 1a are equal and maximized for the inputs of the aforementioned four patterns (I) to (IV).

There is no performance difference between the first embodiment and the present embodiment. In the first embodiment, the bit X for generating the signal of the I component and the bit Y for generating the signal of the Q component are input to each QPSK modulator in parallel, and, in the present embodiment, the bit X and the bit Y are separately input to separate N bit optical DACs. The first embodiment and the present embodiment are different in this point. Which of the first embodiment and the present embodiment is to be used may be determined for convenience on the side of the electrical circuit.

Although N is equal to 4 in the present embodiment as in the first embodiment, the present invention is not limited thereto. In the present embodiment, it is possible to achieve a high-order QAM of equal to or greater than 2 QAM by setting N to a higher value.

Figure 9:
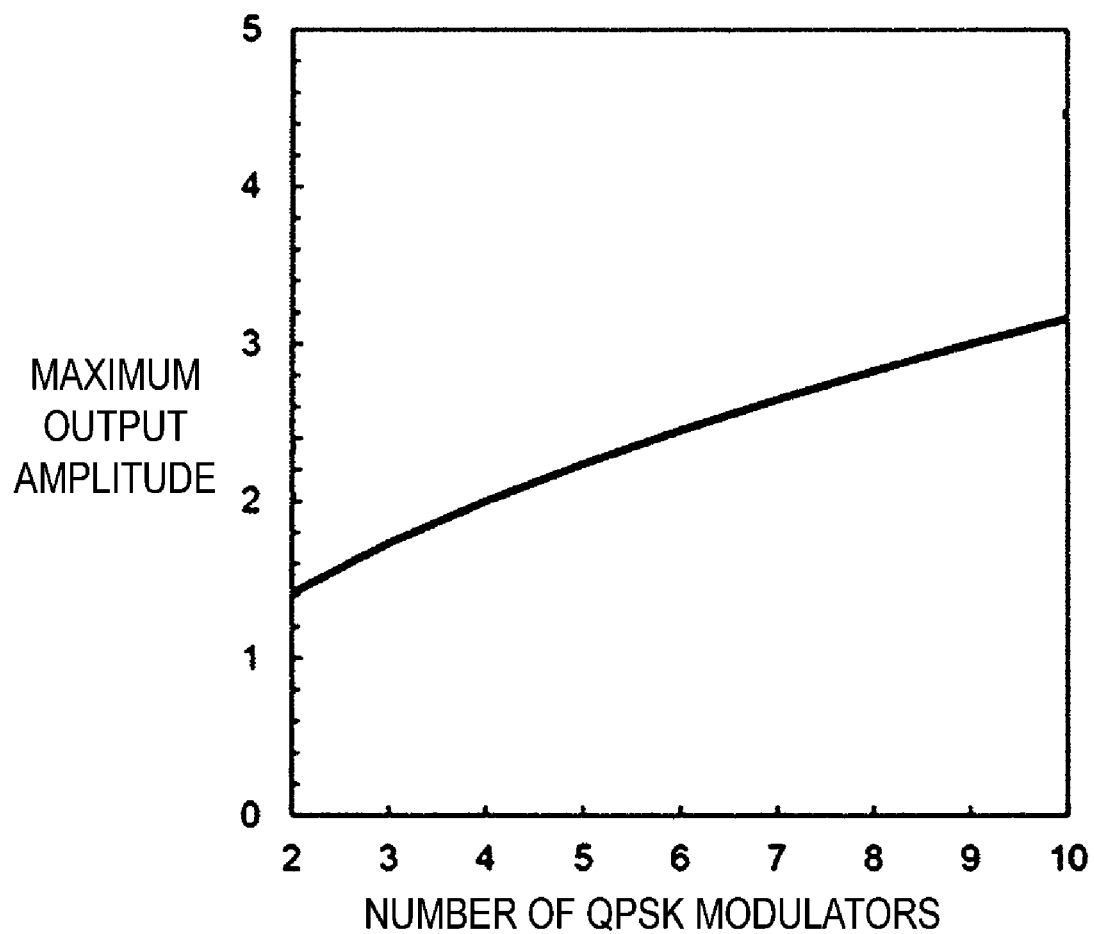
FIG. 9 is a diagram illustrating a maximum output amplitude with respect to the number of QPSK modulators in the optical IQ modulator according to the first and second embodiments of the present invention.

The maximum output amplitudes with respect to the number of QPSK modulators in the optical IQ modulators 1 and 1a in the first and second embodiment are illustrated in FIG. 9. The number of QPSK modulators represented by the horizontal axis corresponds to a half of the number of input bits (N×2). Thus, this means that higher gradation outputs of a larger number of bits can be achieved as the number of QPSK modulators increases. Note that in the case of the optical IQ modulator 1a in the second embodiment, the horizontal axis in FIG. 9 represents the number of phase modulators in the N-bit optical DACs 26 and 27. The vertical axis in FIG. 9 represents amplitudes of the optical IQ modulators 1 and 1a normalized by the maximum output amplitude of the optical IQ modulator in the related art.

Figure 10:
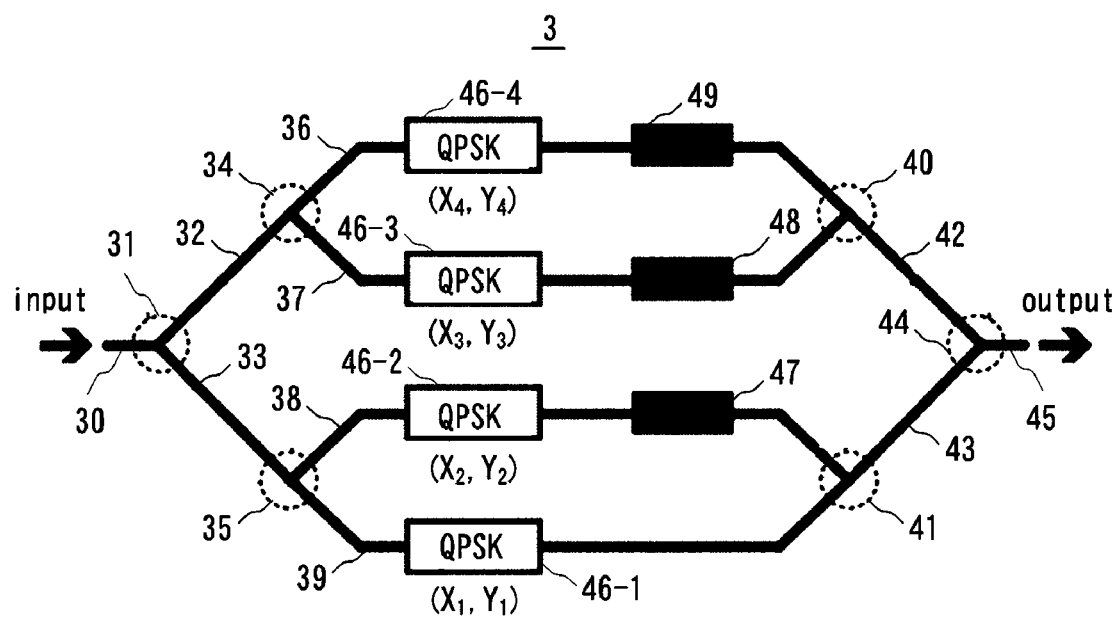
FIG. 10 is a block diagram illustrating a configuration of an optical IQ modulator in the related art.
Figure 11:
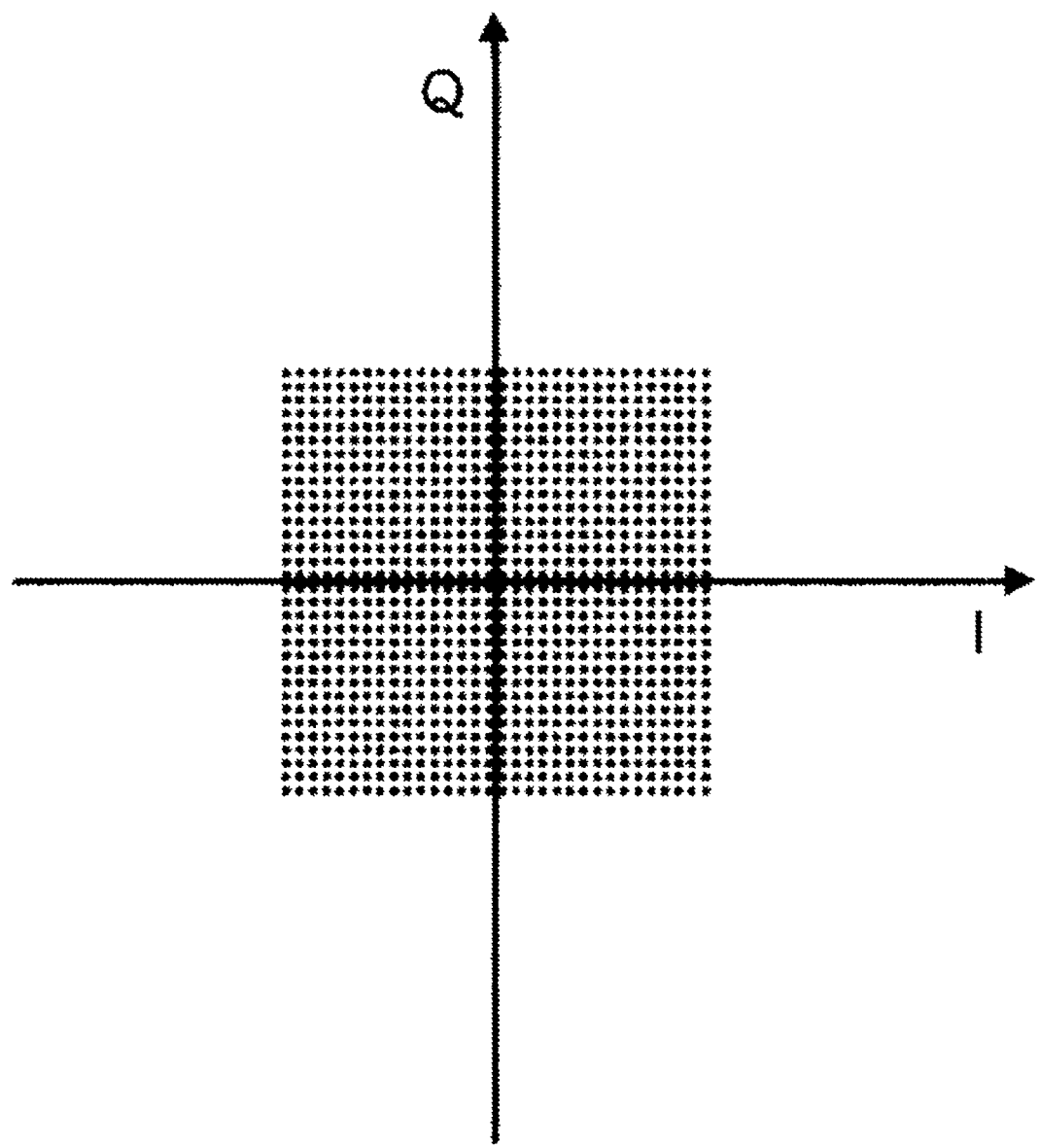
FIG. 11 is a diagram illustrating a constellation of an optical output signal of the optical IQ modulator in the related art on an IQ plane.

FIG. 10 is a block diagram illustrating a configuration of the optical IQ modulator in the related art, and FIG. 11 is a diagram illustrating a constellation of an optical output signal of the optical IQ modulator on an IQ plane. An optical IQ modulator 3 in the related art includes optical waveguides 30, 32, 33, 36 to 39, 42, 43, and 45, Y branching elements 31, 34, and 35, each of which has one input and two outputs, Y combining elements 40, 41, and 44, each of which has two inputs and one output, and QPSK modulators 46-4 to 46-1 provided at the optical waveguides 36 to 39, a fixed optical attenuator 47 with a loss of 6 dB provided at the optical waveguide 38, a fixed optical attenuator 48 with a loss of 12 dB provided at the optical waveguide 37, and a fixed optical attenuator 49 with a loss of 18 dB provided at the optical waveguide 36.

FIG. 10 illustrates an example in which the number of QPSK modulators is four (N=4), and the QPSK modulators function as a 2 QAM modulator. Because bits are not weighted at all at the branching or combining of the light in the optical IQ modulator 3 in the related art, the fixed optical attenuators 47 to 49 inserted into the optical waveguides 38 to 36 perform weighting. Thus, insertion losses increase as compared with the first and second embodiments. Also, the insertion losses further increases as the number of symbols increases.

It can be seen from FIG. 9 that both the optical IQ modulators 1 and 1s in the first and second embodiments are suitable for an increase in gradation as compared with the configuration in the related art.

Numerical simulation for inspecting operations of the three types of configurations of the optical IQ modulators 1 and 1s in the first and second embodiments and the optical IQ modulator 3 in the related art was carried out. Here, simulation was carried out using Optisystem, which was software from Optiwave Systems Inc. A configuration of an optical circuit used for inspecting operations is illustrated in FIG. 12.

Figure 12:
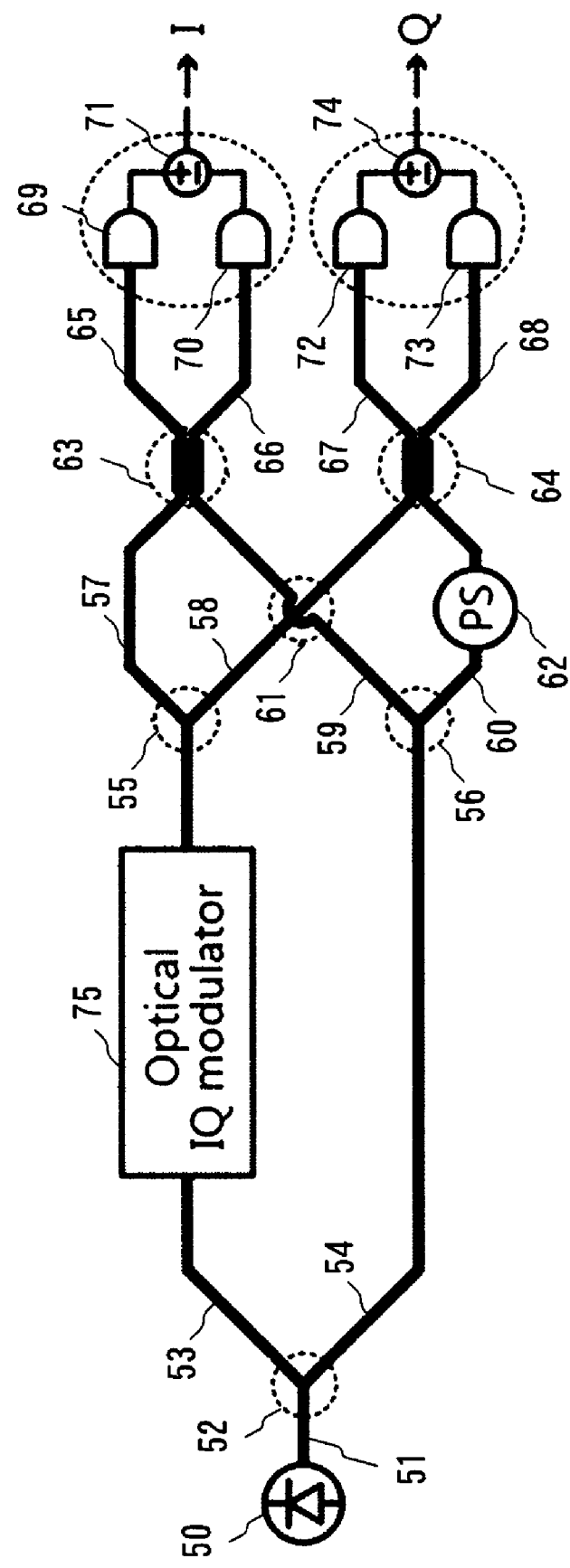
FIG. 12 is a block diagram illustrating a configuration of an optical circuit used to inspect operations of the optical I/Q modulators according to the first and second embodiments of the present invention and the optical I/Q modulator in the related art.

The optical circuit in FIG. 12 includes a continuous laser light source 50, optical waveguides 51, 53, 54, 57 to 60, and 65 to 68, Y branching elements 52, 55, and 56, each of which has one input and two outputs, an intersecting optical waveguide 61 three-dimensionally intersecting the optical waveguide 58 and the optical waveguide 59, a phase shifter 62 shifting the phase of light propagated through the optical waveguide 60 by $\pi/2$, a 2×2 coupler 63 combining light propagated through the optical waveguide 57 and light propagated through the optical waveguide 59, equally splitting the light into two beams of light, and outputting the two beams of light, a 2×2 coupler 64 combining light propagated through the optical waveguide 58 and the light propagated through the optical waveguide 60, equally splitting the light into two beams of light, and outputting the two beams of light, a detector 69 converting one of the output beams of light of the 2×2 coupler 63 into an electrical signal, a detector 70 converting the other output beam of light of the 2×2 coupler 63 into an electrical signal, a subtracter 71 obtaining a difference between the electrical signals output from the detectors 69 and 70, a detector 72 converting one of the output beams of light of the 2×2 coupler 64 into an electrical signal, a detector 73 converting the other output beam of light of the 2×2 coupler 64 into an electrical signal, and a subtracter 74 obtaining a difference between the electrical signals output from the detectors 72 and 73.

Any one of the optical IQ modulators 1 and 1a in the first and second embodiments and the optical IQ modulator 3 in the related art is inserted into a part designated by the reference numeral 75 in the optical waveguide 53.

FIG. 12 illustrates an optical circuit in a case in which so-called coherent detection is performed. In the example in FIG. 12, the continuous light from the continuous laser light source 50 is equally split into two beams of light by the Y branching element 52, and one of the continuous beams of light is input to the optical IQ modulator. The other continuous beam of light branched by the Y branching element 52 is propagated through the optical waveguide 54, the Y branching element 56, and the optical waveguide 59 and is input as reference light to the 2×2 coupler 63.

The 2×2 coupler 63 combines the reference light and the output light of the optical IQ modulator at an equal ratio, equally splits the light into two beams of light, and outputs the two beams of light. The detectors 69 and 70 convert the two output beams of light of the 2×2 coupler 63 into electrical signals. The subtracter 71 obtains a difference between the two electrical signals output from the detectors

69 and 70. In this manner, it is possible to detect the I component using a configuration of balanced detectors (balanced receivers) including the detectors 69 and 70 and the subtracter 71.

On the other hand, the 2×2 coupler 64 combines the reference light with the phase shifted by π/2 by the phase shifter 62 and the output light of the optical IQ modulator at an equal ratio, equally splits the light into two beams of light, and outputs the two beams of light. The detectors 72 and 73 convert the two output beams of light of the 2×2 coupler 64 into electrical signals. The subtracter 74 obtains a difference between the two electrical signals output from the detectors 72 and 73. In this manner, it is possible to detect the Q component using a configuration of balanced detectors including the detectors 72 and 73 and the subtracter 74.

Figure 13A:
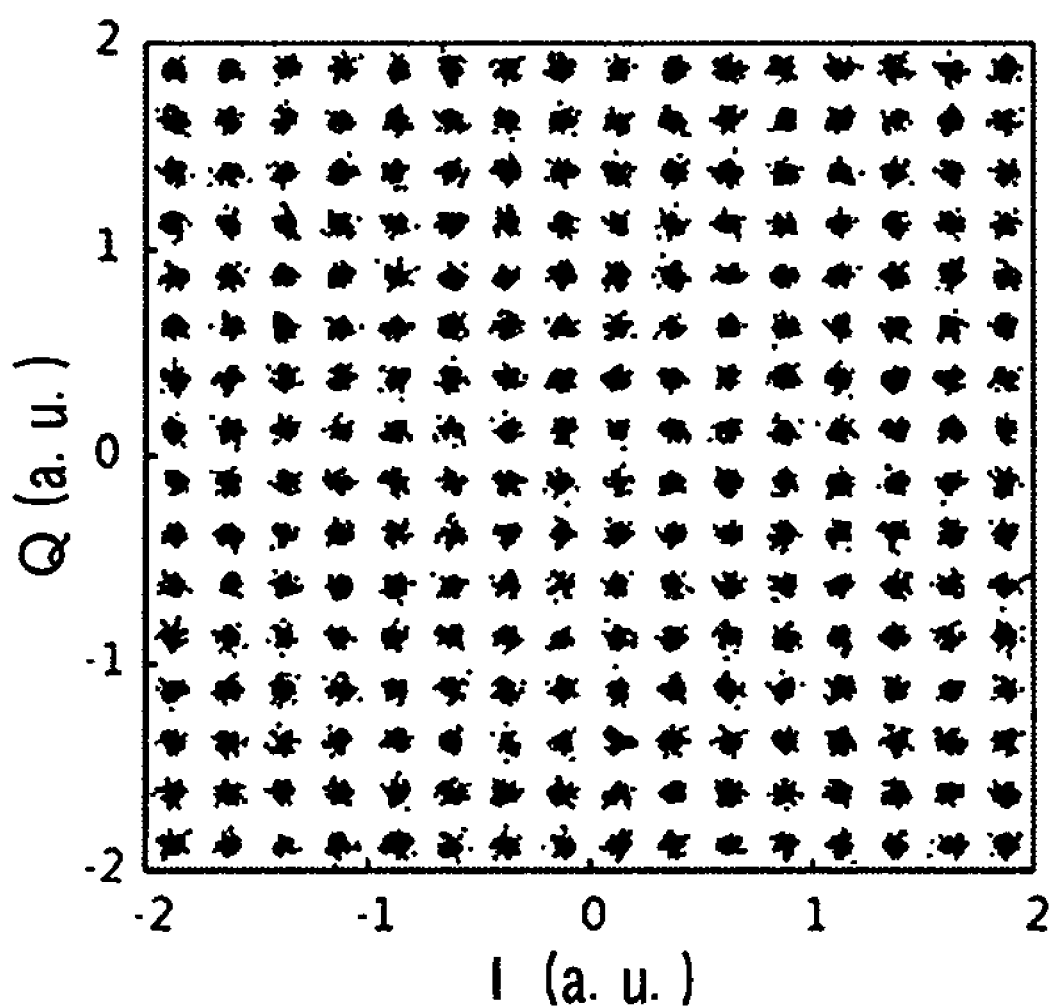
FIGS. 13A and 13B are diagrams illustrating constellations of simulation results on an IQ plane in a case in which the optical IQ modulator according to the first embodiment of the present invention and the optical IQ modulator in the related art are inserted into the optical circuit in FIG. 12.
Figure 13B:
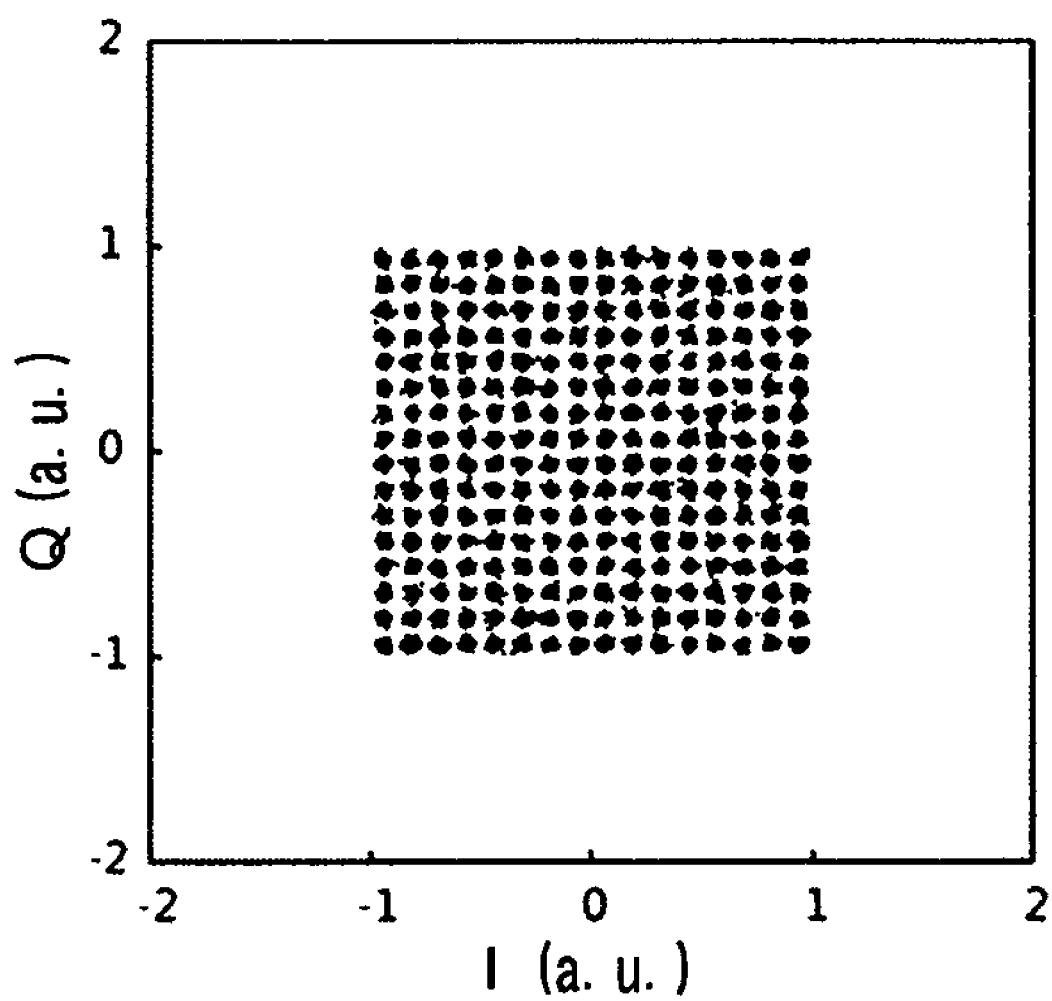

FIG. 13A is a diagram illustrating a constellation of a simulation result on an IQ plane in a case where the optical IQ modulator 1 in the first embodiment is inserted into the optical waveguide 53 in the optical circuit in FIG. 12. FIG. 13B is a diagram illustrating a constellation of a simulation result on an IQ plane in a case where the optical IQ modulator 3 in the related art is inserted into the optical waveguide 53.

In the simulation using the optical circuit in FIG. 12, the symbol rate is set to 10 GS/s. In the laser light source 50, a wavelength is set to 1550 nm and light intensity is set to 10 dBm. A noise spectral power density (NSPD) of each phase modulator used in the optical IQ modulators 1, 1a, and 3 is −120 dBm/Hz. PD-40 which is an InGaAs-based optical detector manufactured by Optilab, LLC is assumed to be used as each of the detectors 69, 70, 72, and 73. The optical detector has conversion efficiency of 0.8 A/W and has a radio frequency (RF) band of 40 GHz. Also, an insertion loss of all passive elements is assumed to be 0 dB.

In comparison between FIG. 13A and FIG. 13B, the amplitude value is larger and signal is clearer in FIG. 13A. It can be seen that the optical IQ modulator 1 in the first embodiment is more advantageous for an improvement in SNR than the optical IQ modulator 3 in the related art because the amplitude is about two times larger, that is, there is a difference of 6 dB between the insertion losses.

Although the 2QAM modulator with N being set to four is achieved in the first and second embodiments, it is also possible to achieve yet higher order QAM modulators.

Figure 14A:
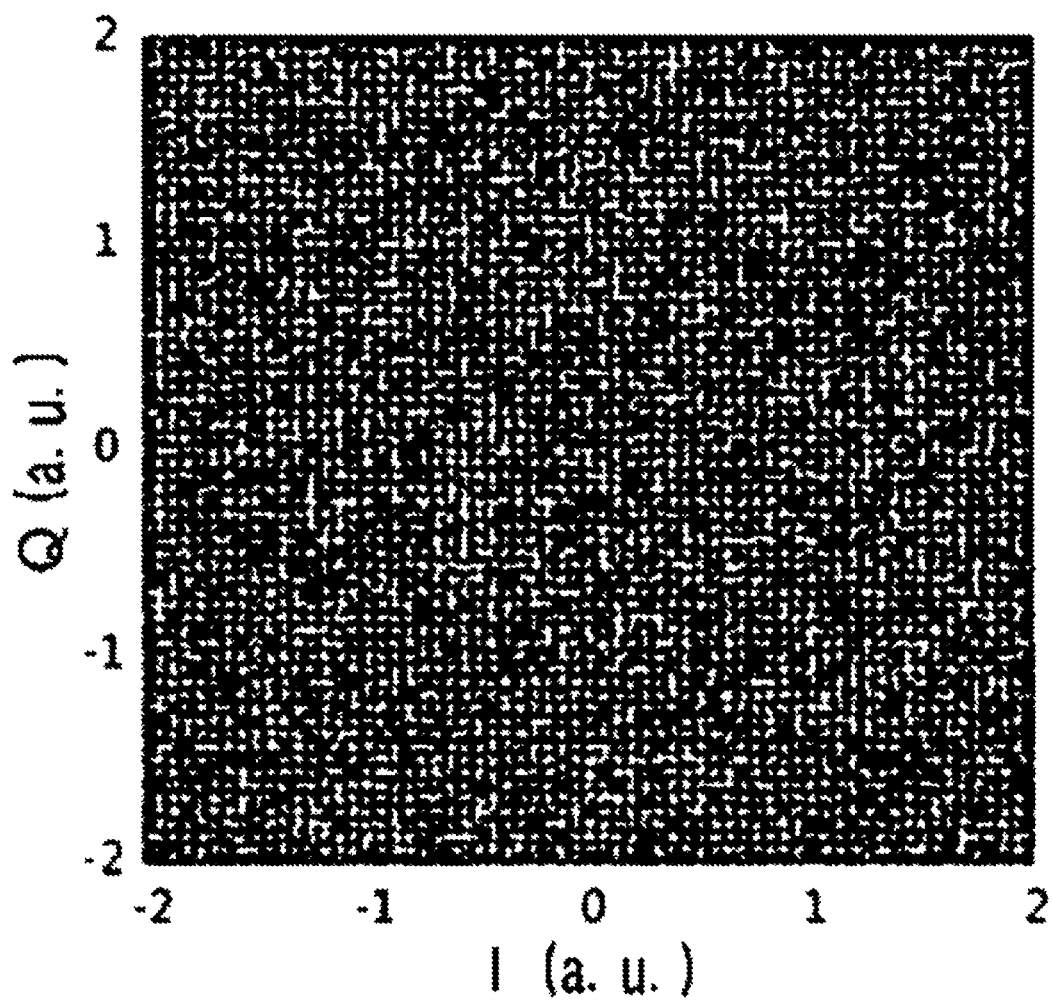
FIGS. 14A and 14B are diagrams illustrating constellations of simulation results on an IQ plane in a case in which the optical IQ modulator with N being set to six in the first embodiment of the present invention and the optical IQ modulator with six QPSK modulators connected in parallel in the configuration in the related art are inserted into the optical circuit in FIG. 12.
Figure 14B:
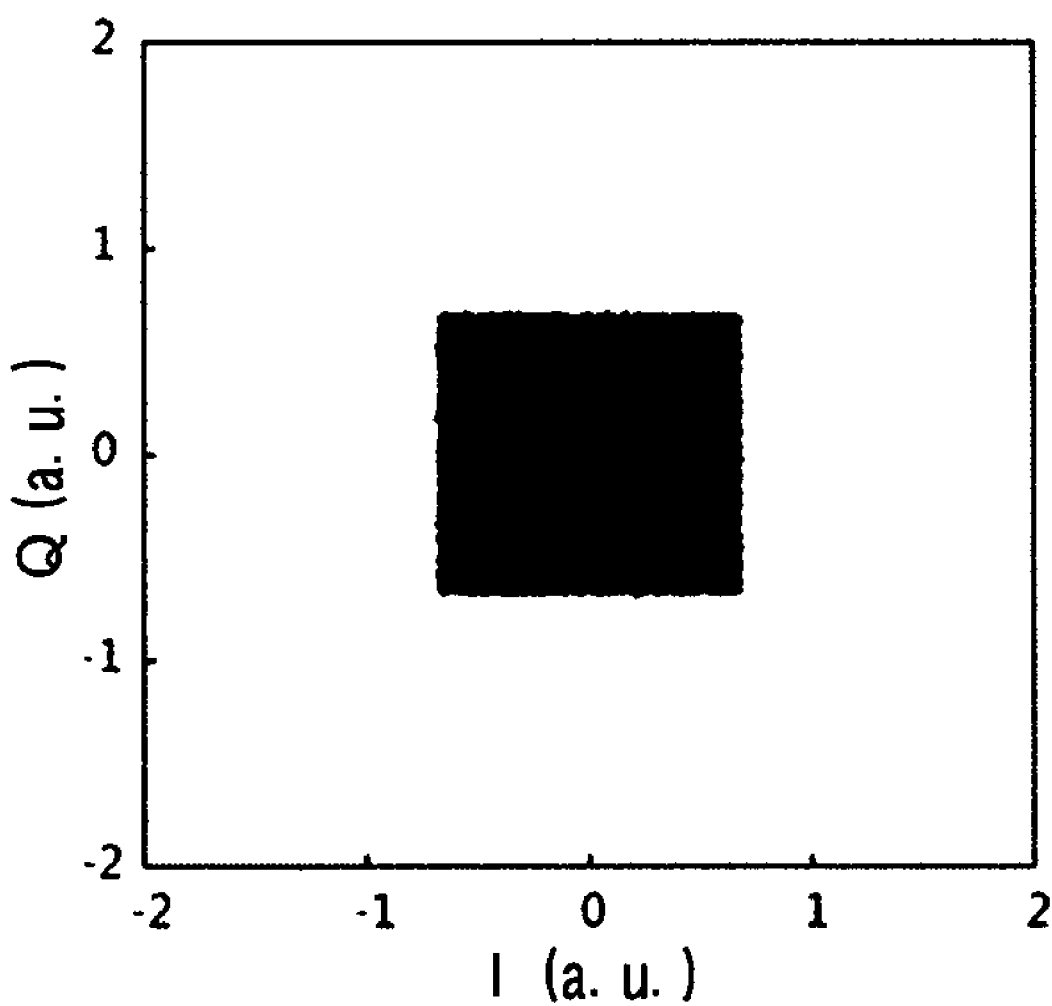
Figure 15A:
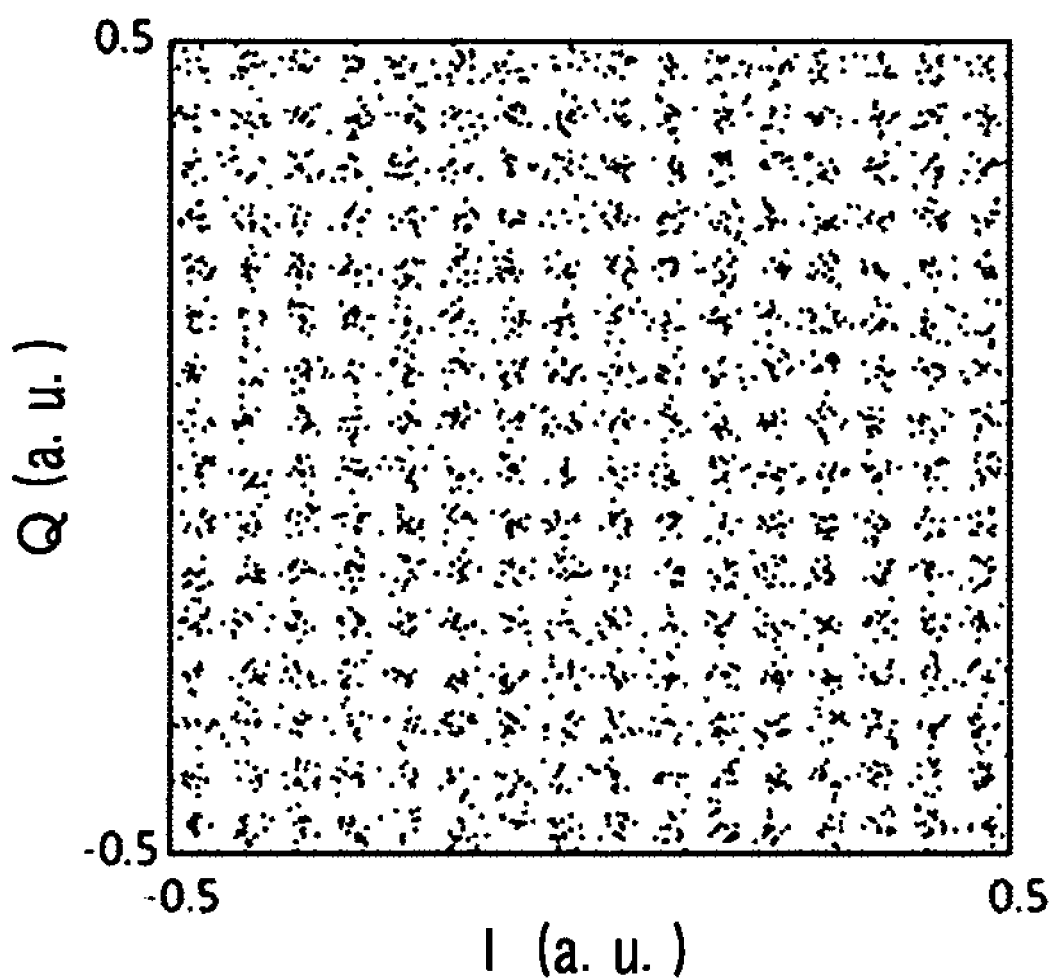
FIGS. 15A and 15B are diagrams illustrating FIGS. 14A and 14B in an enlarged manner.
Figure 15B:
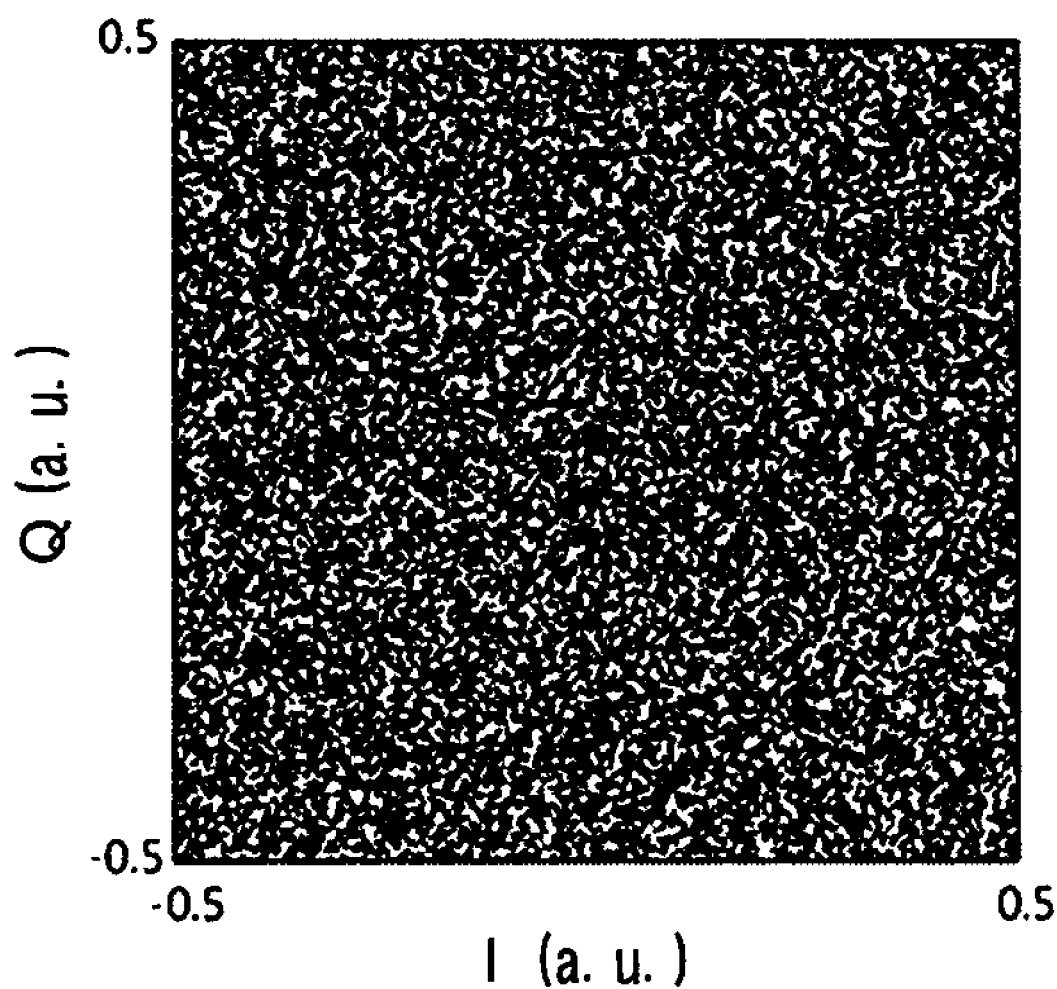

FIG. 14A is a diagram illustrating a constellation of a simulation result on an IQ plane in a case where an optical IQ modulator with N being set to six is inserted into the optical waveguide 53 in the optical circuit in FIG. 12 in the first embodiment. FIG. 14B is a diagram illustrating a constellation of a simulation result on an IQ plane in a case where an optical IQ modulator including six QPSK modulators connected in parallel is inserted into the optical waveguide 53 in the configuration in the related art in FIG. 9. FIGS. 15A and 15B are enlarged views of FIGS. 14A and 14B, respectively.

It is possible to achieve a 4096 QAM modulator with N being set to six in the first embodiment and connecting the six QPSK modulators in parallel in the configuration in the related art. Simulation conditions are the same as those in the case of the 2 QAM modulator other than the setting of the NSPD being as small as −130 dBm/Hz.

In comparison between FIGS. 14A and 14B, the amplitude value is larger and the signal is clearer in FIG. 14A. In a high order QAM modulator, the difference in insertion loss between the configuration in the first embodiment and the configuration in the related art increases. Although the loss increases in the configuration in the related art as the order QAM becomes higher, the loss rather decreases in the first embodiment. As can be seen from FIGS. 15A and 15B, it is obvious that the first embodiment achieves a better SNR when the input power is the same.

Figure 16A:
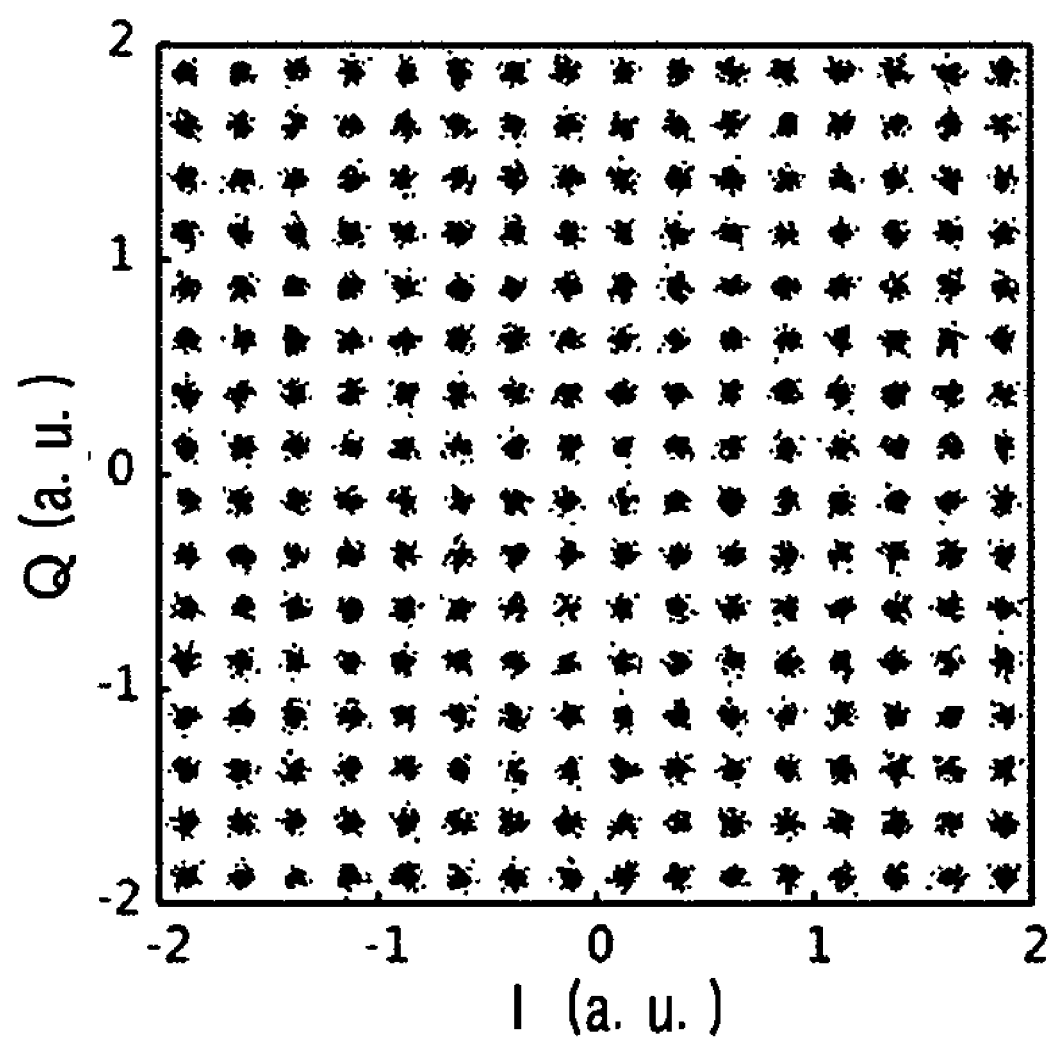
FIGS. 16A and 16B are diagrams illustrating constellations of simulation results on an IQ plane in a case in which the optical IQ modulators according to the first and second embodiments of the present invention are inserted into the optical circuit in FIG. 12.
Figure 16B:
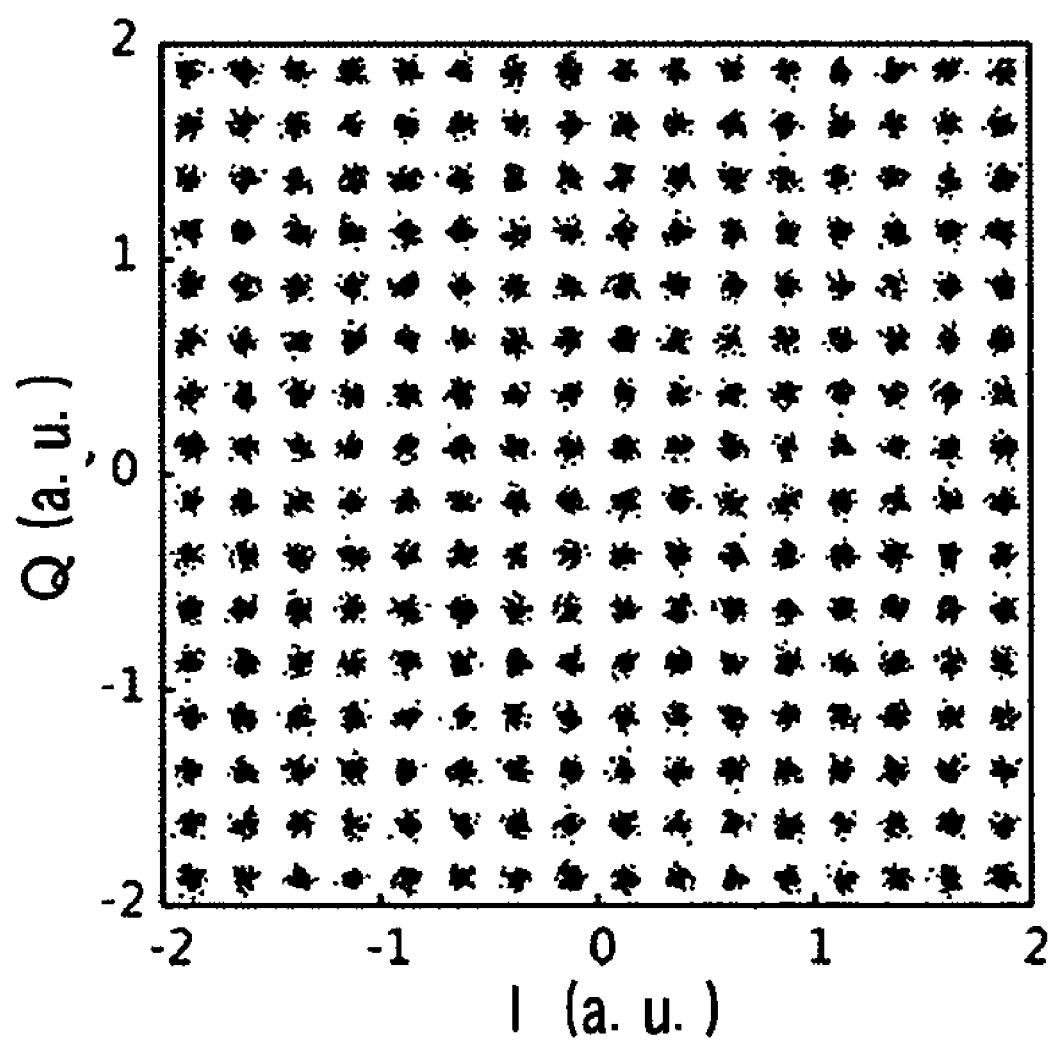

FIG. 16A is a diagram illustrating a constellation of a simulation result on an IQ plane in a case where the optical IQ modulator 1 in the first embodiment is inserted into the optical waveguide 53 of the optical circuit in FIG. 12. FIG. 16B is a diagram illustrating a constellation of a simulation result on an IQ plane in a case where the optical IQ modulator 1a in the second embodiment is inserted into the optical waveguide 53.

Simulation conditions are the same as those in the cases of FIGS. 13A and 13B. As is obvious from FIGS. 16A and 16B, it can be seen that the SNRs of the optical IQ modulators 1 and 1a are equivalent and there is no performance difference between the optical IQ modulators 1 and 1a.

Figure 17A:
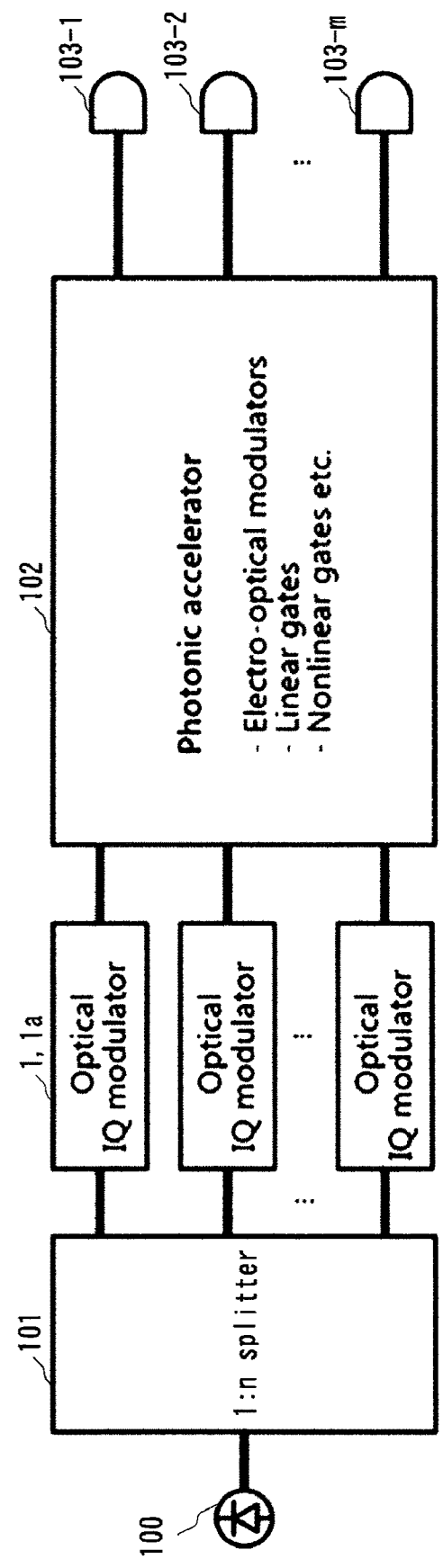
FIGS. 17A and 17B are diagrams illustrating utilization forms in a case in which the optical IQ modulators according to the first and second embodiments of the present invention are used in optical accelerators.
Figure 17B:
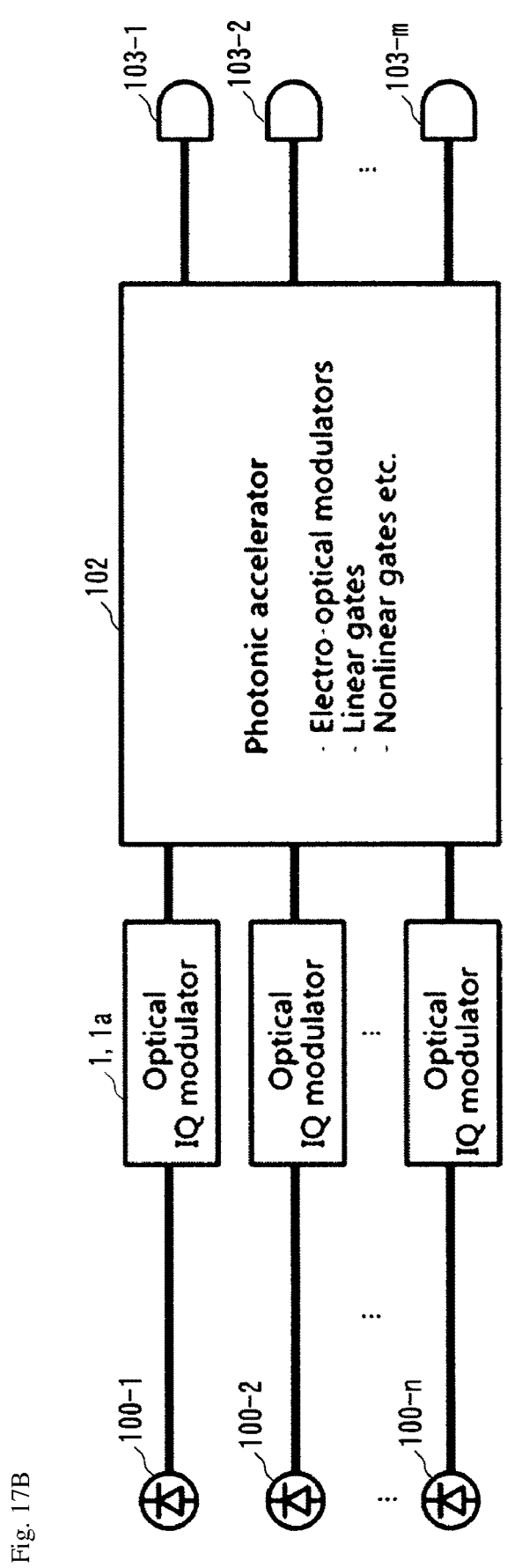

FIGS. 17A and 17B illustrate utilization forms in a case in which the optical IQ modulators 1 and 1a in the first and second embodiments are used in optical accelerators. In the examples of FIGS. 17A and 17B, the optical IQ modulators 1 and 1a, the number of which corresponds to the number n of inputs (n is an integer equal to or greater than two) of an optical accelerator circuit 102, are connected.

As illustrated in FIG. 17A, it is possible to perform a coherent operation such as a stable vector operation by supplying the same light to each of the optical IQ modulators using a 1:n splitter 101 in a case in which the number of optical sources 100 is one. However, there is a problem that intensity of the light input to each of the optical IQ modulators decreases.

On the other hand, in a case in which n light sources 100-1 to 100-n are used as illustrated in FIG. 17B, intensity of the light input to each of the optical IQ modulators increases. However, there is a problem that monitoring of a wavelength of each light source, feedback correction of the wavelength, and the like are needed.

A result of the operation performed by the optical accelerator circuit 102 is extracted by m (m is an integer equal to or greater than two) detectors 103-1 to 103-m. Alternatively, m sets of balanced detectors may be used, or a combination of a single detector 103 and balanced detectors may be used.

INDUSTRIAL APPLICABILITY

Embodiments of the present invention can be applied to an optical IQ modulator.

REFERENCE SIGNS LIST

1, 1a Optical IQ modulator
10, 20, 160, 260 Y branching element
11 to 14, 21 to 23, 25, 161, 162, 261, 262, 264, 265 Optical waveguide
15, 24, 163, 263 Y combining element
16 QPSK modulator
26, 27 Optical DAC
28, 166 Phase shifter
164, 165, 266 Phase modulator.

The invention claimed is:
1. An optical IQ modulator comprising:
N first Y branching elements, N being an integer equal to or greater than two, each of the N first Y branching elements having one input and two outputs and being configured to equally split input light into two beams of continuous light;

N first modulators, each of the N first modulators being configured to perform QPSK modulation on a corresponding one of N continuous beams of light branched by the N first Y branching elements to generate signal light; and N first Y combining elements, each of the N first Y combining elements having two inputs and one output and being configured to use the signal light generated by a corresponding one of the N first modulators as an input, wherein:

the N first Y branching elements are cascade-connected such that each of the N first Y branching elements except for a most upstream one of the N first Y branching elements are configured to receive, as an input, light output from a first optical output port of two optical output ports of an upstream one of the N first Y branching elements, the most upstream one of the N first Y branching elements being configured to receive a single continuous beam of light as an input, output light obtained from a second optical output port of the two optical output ports of each of the N first Y branching elements is configured as input light to a corresponding one of the N first modulators, each of the N first modulators is configured to perform QPSK modulation on the input continuous light in accordance with a bit for generating an I component and a bit for generating a Q component in an N×2-bit electrical digital signal, the N first Y combining elements are cascade-connected such that each of (N−1) first Y combining elements except for a most upstream one of the N first Y combining elements is configured to receive light output from an optical output port of an upstream one of the N first Y combining elements as input light to a first optical input port, and each of the N first Y combining elements is configured to receive signal light generated by a corresponding one of the N first modulators as input light to a second optical input port, and output light obtained from a most downstream one of the N first Y combining elements is configured to be output as QAM signal light.

2. The optical IQ modulator according to claim 1, wherein each of the N first modulators includes:
a second Y branching element having one input and two outputs and configured to equally split input light into two beams of light.

3. The optical IQ modulator according to claim 2, wherein each of the N first modulators further includes:
a second modulator configured to perform phase modulation on one of the continuous beams of light branched by the second Y branching element in accordance with the bit for generating the I component in the N×2-bit electrical digital signal.

4. The optical IQ modulator according to claim 3, wherein each of the N first modulators further includes:
a third modulator configured to perform phase modulation on another one of the continuous beams of light branched by the second Y branching element in accordance with the bit for generating the Q component in the N x 2-bit electrical digital signal.

5. The optical IQ modulator according to claim 4, wherein each of the N first modulators further includes:
a phase shifter configured to shift a phase of output light of the third modulator by $\pi/2$.

6. The optical IQ modulator according to claim 5, wherein each of the N first modulators further includes:
a second Y combining element having two inputs and one output and configured to combine output light from the second modulator and output light from the phase shifter and output combined light.

* * * * *